United States Patent
Jernigan, IV

(10) Patent No.: US 12,314,189 B2
(45) Date of Patent: May 27, 2025

(54) BOTTLENECK MANAGEMENT TECHNIQUES USING NON-DISRUPTIVE FILE MOVEMENT MECHANISMS IN DISTRIBUTED STORAGE ENVIRONMENTS

(71) Applicant: NetApp, Inc., San Jose, CA (US)

(72) Inventor: Richard Parvin Jernigan, IV, Sewickley, PA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/488,727

(22) Filed: Oct. 17, 2023

(65) Prior Publication Data

US 2025/0123973 A1    Apr. 17, 2025

(51) Int. Cl.
| | | |
|---|---|---|
| G06F 12/123 | (2016.01) | |
| G06F 3/06 | (2006.01) | |
| G06F 12/0817 | (2016.01) | |
| G06F 12/0877 | (2016.01) | |

(52) U.S. Cl.
CPC .......... *G06F 12/123* (2013.01); *G06F 3/0611* (2013.01); *G06F 3/0635* (2013.01); *G06F 3/067* (2013.01); *G06F 12/0817* (2013.01); *G06F 12/0877* (2013.01)

(58) Field of Classification Search
CPC ...... G06F 3/0611; G06F 3/0635; G06F 3/067; G06F 12/0817; G06F 12/0877; G06F 12/123
See application file for complete search history.

(56) References Cited

U.S. PATENT DOCUMENTS

| | | |
|---|---|---|
| 7,991,734 B2 | 8/2011 | Park et al. |
| 9,886,697 B1 | 2/2018 | Sivertsen |
| 2001/0018766 A1 | 8/2001 | Morita et al. |
| 2003/0182330 A1 | 9/2003 | Manley et al. |
| 2003/0182428 A1* | 9/2003 | Li ........................ H04L 67/104 709/227 |
| 2006/0114836 A1 | 6/2006 | Pollin et al. |
| 2006/0265467 A1* | 11/2006 | Jang ........................ H04L 67/06 709/216 |

(Continued)

OTHER PUBLICATIONS

Non-Final Office Action mailed on Oct. 9, 2024 for U.S. Appl. No. 18/305,927, filed Apr. 24, 2023, 18 pages.

(Continued)

*Primary Examiner* — Larry T Mackall
(74) *Attorney, Agent, or Firm* — Jaffery Watson Hamilton & DeSanctis LLP

(57) ABSTRACT

Approaches to data flow bottleneck management using caching mechanisms in a distributed storage environment are disclosed. A request is received by a first data storage node having a first set of interface components, a first set of data management components, a first advisory cache, and a first set of data storage devices. The request has a corresponding file. The first advisory cache is checked for an entry corresponding to the file. The request is routed based on a file characteristic corresponding to the request if there is no corresponding entry in the first advisory cache or to a second data storage node based on the entry in the first advisory cache. Potential bottleneck conditions are monitored on the first node. An advisory cache entry in the first advisory cache is generated in response to determining that a bottleneck condition exists.

24 Claims, 12 Drawing Sheets

(56) References Cited

U.S. PATENT DOCUMENTS

| | | |
|---|---|---|
| 2011/0060887 A1 | 3/2011 | Thatcher et al. |
| 2012/0036161 A1 | 2/2012 | Lacapra et al. |
| 2015/0370825 A1 | 12/2015 | Outcalt et al. |
| 2019/0215358 A1 | 7/2019 | Kobayashi et al. |
| 2020/0301880 A1 | 9/2020 | George et al. |
| 2021/0049044 A1 | 2/2021 | Wong et al. |
| 2024/0354281 A1 | 10/2024 | Jernigan et al. |

OTHER PUBLICATIONS

Non-Final Office Action mailed on Sep. 11, 2024 for U.S. Appl. No. 18/488,755, filed Oct. 17, 2023, 27 pages.

\* cited by examiner

BOTTLENECK MANAGEMENT TECHNIQUES USING NON-DISRUPTIVE FILE MOVEMENT MECHANISMS IN DISTRIBUTED STORAGE ENVIRONMENTS

RELATED APPLICATIONS

This U.S. Patent Application is related to U.S. patent application Ser. No. 18/488,755 filed concurrently herewith and entitled "BOTTLENECK MANAGEMENT TECHNIQUES USING NON-DISRUPTIVE FILE MOVEMENT MECHANISMS IN DISTRIBUTED STORAGE ENVIRONMENTS," by Richard Jernigan.

BACKGROUND

A node, such as a server, a computing device, a virtual machine, etc., may host a storage operating system. The storage operating system may be configured to store data on behalf of client devices, such as within volumes, aggregates, storage devices, cloud storage, locally attached storage, etc. In this way, a client can issue a read operation or a write operation to the storage operating system of the node in order to read data from storage or write data to the storage. The storage operating system may implement a storage file system through which the data is organized and accessible to the client devices. The storage file system may be tailored for managing the storage and access of data within hard drives, solid state drives, cloud storage, and/or other storage that may be relatively slower than memory or other types of faster and lower latency storage.

BRIEF SUMMARY

In an example, a data request is received at a first data storage node having a first set of interface components, a first set of data management components, a first advisory cache, and a first set of data storage devices. The read request has a corresponding file. The first advisory cache is checked for an entry corresponding to the file. The data request based is routed on a file characteristic corresponding to the data request if there is no corresponding entry in the first advisory cache and routing the data request to a second data storage node based on the corresponding entry in the first advisory cache when available. If conditions on the first node indicate a bottleneck condition, generating an advisory cache entry in the first advisory cache corresponding to the bottleneck condition in response to determining that a bottleneck condition exists. Information corresponding to the advisory cache entry is transmitted to the second node.

In an example, the file characteristic is a file handle. In an example, the file characteristic comprises a directory handle. In an example, determining whether conditions on the first node indicate a bottleneck condition comprises applying a points-based analysis based on queue latency. In an example, the points-based analysis is a function of at least raw access count and access percentile. In an example, a bonus points approach is used to adjust the cache advisory entry. In an example, the advisory cache entry includes at least a key value that identifies the corresponding file or directory, an expiration value to indicate a validity period for the advisory cache entry, and a candidates list indicating one or more nodes that can be used to service subsequent requests.

In an example system, a first data storage node has a first set of interface components, a first set of data management components, a first advisory cache, and a first set of data storage devices. In the example system, a second data storage node coupled with the first data storage node, the second data storage node has a second set of interface components, a second set of data management components, a second advisory cache, and a second set of data storage devices. The first set of interface components receive a data request having a corresponding file. The first set of interface components check the first advisory cache for an entry corresponding to the file. The first set of interface components route the read request based on a file characteristic corresponding to the data request if there is no corresponding entry in the first advisory cache and route the data request to the second data storage node based on the corresponding entry in the first advisory cache when available. The second set of data management components receive the data request from the first node and service the request with the second set of data storage devices. The second node analyzes the data request from the first node to determine whether conditions on the second node indicate a bottleneck condition, and in response to determining a bottleneck condition exists, generate an advisory cache entry in the second advisory cache corresponding to the bottleneck condition. The second node returns to the first node data read when servicing the data request, and, if the bottleneck condition exists, information corresponding to the advisory cache entry. The first node returns at least the data as a response to the read request received by the first node.

In an example system, the file characteristic is a file handle. In an example system, the file characteristic comprises a directory handle. In an example system, determining whether conditions on the first node indicate a bottleneck condition includes applying a points-based analysis based on queue latency. In an example system, the points-based analysis is a function of at least raw access count and access percentile. In an example system, a bonus points approach is used to adjust the cache advisory entry. In an example system, the advisory cache entry includes at least a key value that identifies the corresponding file or directory, an expiration value to indicate a validity period for the advisory cache entry, and a candidates list indicating one or more nodes that can be used to service subsequent requests.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
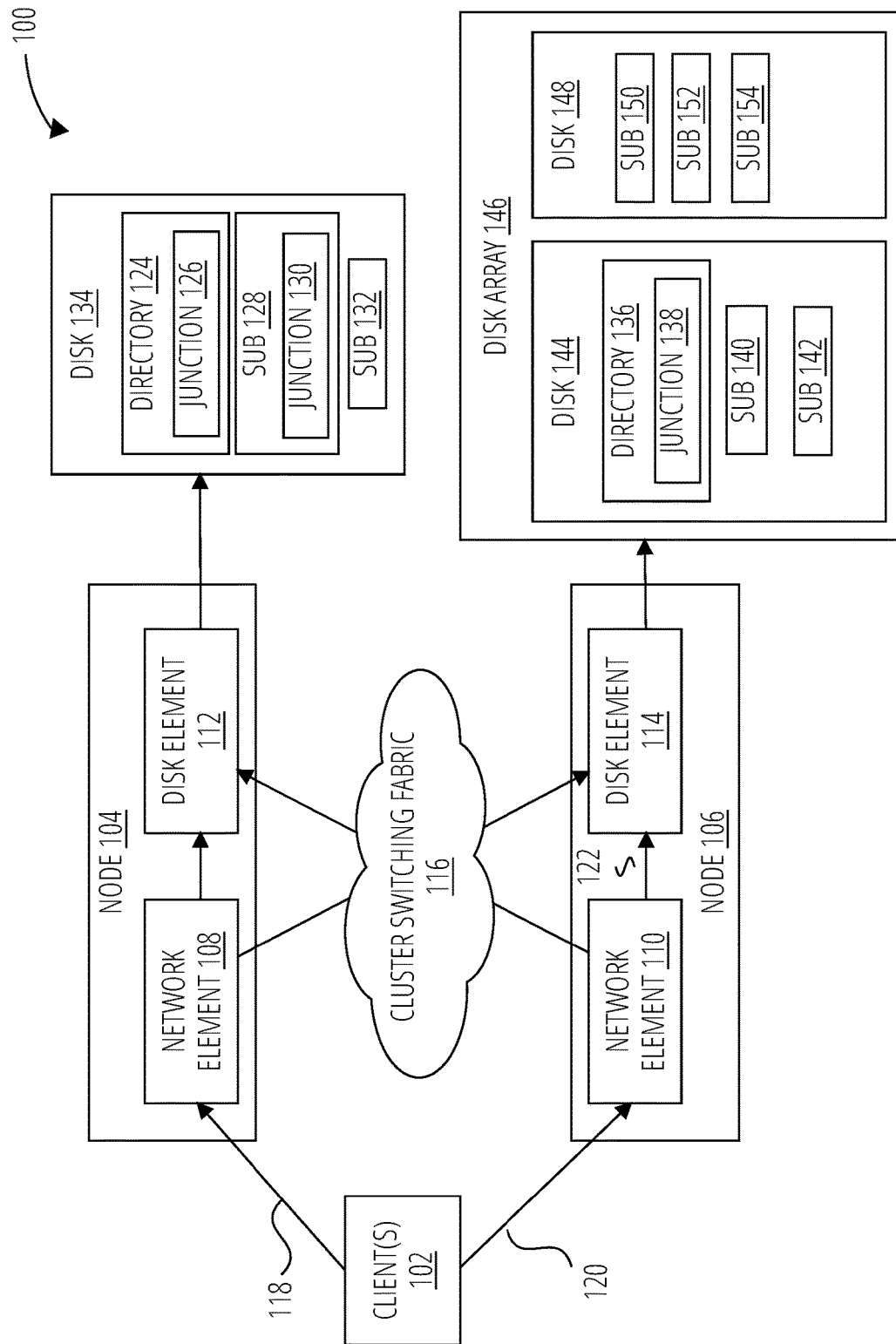
FIG. 1 illustrates one embodiment of block diagram of a plurality of nodes interconnected as a cluster.

In the following description, for the purposes of explanation, numerous specific details are set forth in order to provide a thorough understanding of the present disclosure. It will be apparent, however, to one skilled in the art that the present disclosure may be practiced without some of these specific details. In other instances, well-known structures and devices are shown in block diagram form to avoid obscuring the underlying principles of the present disclosure.

In the description that follows, various example architectures and approaches are provided that can reduce the risk of bottlenecks from heavy concurrent traffic to a subset of very active files, directories, storage devices, processors, caches, etc. Specific examples are provided in terms of the ONTAP® operating system available from NetApp™, Inc., Sunnyvale, Calif. that can implement a Write Anywhere File Layout (WAFL®) file system; however, other operating systems (with or without WAFL-equivalent functionality) for use in distributed storage systems can also be utilized to provide the functionality described herein. As such, where the term "WAFL" is employed, it should be taken broadly to refer to any storage operating system that is otherwise adaptable to the teachings of this disclosure.

As a preliminary example, if a specific file (e.g., File A) begins to receive a heavy load of read traffic such that requests begin to back up the management mechanisms for the devices involved automatically begin to distribute the flood of requests for that particular file to multiple member volumes which in turn service those requests by establishing caches of the content. As another example, if a directory subjected to a high volume of Read or Lookup requests, subsequent requests can be treated in the same way.

As a further example, if a collection of relatively hot files and directories together begin to form a bottleneck on a member volume, the management mechanisms can select individual alternate member volumes for individual files and directories within that collection and begin to route traffic for the respective hot content to their chosen secondary sites instead. In an example, the requests are handled locally using caches of the original content established in response to detection of the bottleneck condition. As the load on the original content dwindles the frequency of redirection is automatically reduced until, upon cessation of the problematic load, it is eliminated.

The various examples described herein allow the host operating system (e.g., ONTAP®) to employ caching to address bottlenecks. More straightforward responses to bottleneck conditions may lean towards, as a first example, automatically creating a cache on the same nodes as a group of constituent volumes, establishing a relationship between that cache and overloaded constituent volumes, and processing requests using the cache. Alternatively, as a second example straightforward approach, an existing constituent volume can automatically expand itself in response to bottlenecks, thereby creating additional member volumes within the group that would be different from other members, serving only as storage for cache requests. These general approaches, while plausible, suffer from drawbacks that the architectures and approaches described herein do not suffer from, the details of which are provided in the drawings and the description below.

Within the ONTAP context, the equivalent to the first example above is to create a new FlexCache volume (and a corresponding new "caching relationship" between volumes), which is undesirable for a number of reasons. The equivalent to the second example above, is to create new member volumes within the FlexGroup that would exclusively serve cached content. As described in detail below, a third approach is provided where the existing member volumes can be employed to engage caching without these steps. Again, specific examples may be provided in terms of the ONTAP® operating system; however, other operating systems for use in distributed storage systems can also be utilized to provide the functionality described herein. Thus, the approaches described are not limited to use in an ONTAP-based environment.

The approaches described herein can be utilized within various architectures (examples of which are provided in the Figures) to accomplish one or more of the following: 1) Bottleneck detection; 2) Load distribution; 3) Selective one-to-one or one-to-many mapping; and 4) Reactive caching configuration. Accomplishing one or more of these goals can provide an intelligent approach to managing bottleneck conditions in complex multi-node/multi-member architectures.

Bottleneck detection can include sufficient information about the bottleneck condition to engage responses (e.g., employing a cache) for files and/or directories that will potentially benefit from the response. In various examples, the bottleneck mitigation capability is utilized only to address bottlenecks, not under steady state. In some examples, it is engaged and disengaged automatically because serving one request (or relatively few requests) through a cache is very expensive. For example, there is the expense of establishing the cache (including retrieving every needed buffer, which may require multiple messages), and the memory costs of whatever tracking mechanisms are needed to force the request to be serviced by its new home, etc. If only this one request (or relatively few requests) is/are served from the cache, the cost of tearing down the cache at the end must also be considered as well as the increase in latency from clients who were waiting for that tear-down.

However, the more requests that can be served from a cache, the more successfully the cost of the cache can be amortized. And if the cache lasts long enough, overall performance improvements can be achieved by having eliminated a bottleneck through, for example, providing more than one site that can answer request traffic. Conceptually, a key to success is to engage the described caching mechanisms only for files and/or directories that will benefit from it. Thus, content that is forming an actionable bottleneck is identified and caching for that content is engaged.

In summary, the mechanisms described below, in contrast to the straightforward solutions mentioned above, intentionally (and very carefully) selects particular caching sites for each and every file—taking into account the current load distribution within the cluster and the severity of the bottleneck on the corresponding particular file. The result is that the mechanisms described below are not just trying to offload work from the origin (like a whole-volume cache might try to accomplish), but instead is intentionally trying to shift load for a specific file from its overloaded host to one or more specifically selected under-loaded members.

Further, the approaches described herein may be a better choice for the environment, because here the cache and the origin are both part of the same cluster: they're sharing the same resources, such that best behavior involves intentionally leveling traffic among members rather than blindly trying to provide a less adaptive whole-volume cache that will steal computational resources from the origin (as it intercepts traffic and establishes and tears down caches that were not really needed) and bulk up the storage consumption (as it replicates not-bottlenecked files unnecessarily) without intentionally offloading work from overburdened members and onto members that have capacity remaining.

More specifically, in response to detecting an actionable bottleneck condition, one or more load distribution techniques can be applied. In an example, the caching mechanism is only engaged for content corresponding to an over-active member and traffic is shifted to under-active members. Even if a member volume is spending all its time serving operations for one single file, that access pattern is not actionable if the member volume is less busy than its peers. That is, the caching mechanism is only engaged for traffic directed to a file or directory if an evaluation of the operating environment indicates that conditions would be better if at least some of the traffic is routed to a different device by rerouting at least some of the traffic from a member that is over-active to a member that is under-active. In an example, the definition of under-active or over-active is a question of each member's activity levels compared to its peers because the proposed remedy is to shift traffic among the members.

As part of the load distribution approach, a combination of one-to-one and one-to-many techniques can be employed. In an example, if several member volumes are below-average in activity levels all of them can be engaged to some extent in providing caching duties to help over-active peers. Note that this precludes the use of hashing models where each file service is mapped by its file handle directly to exactly one pre-selected member. In an example, if a file or directory is heavily contended, many caches can be utilized concurrently; however, if the bottleneck involves many files with no obvious "tent poles", one cache site for each file can be utilized.

The costs of establishing and later revoking each cache is cumulative. For example, in a group having 64 member volumes, if a particular file on a first member volume is a bottleneck and it is cached on all 63 other member volumes, the costs of establishing 63 separate caches will be paid, and it will take 63 times as much parallel traffic to justify all those caches as compared to a single cache. In an example, the degree to which multiple caches are deployed for a particular file or directory is proportional to how much of the current performance problem is caused by this particular file alone. For example, if a file is considered a major problem multiple caches may be deployed, but if the file is only one of a thousand different files that are all collectively causing trouble, one alternate member volume to act as a cache for each may be a better solution. Thus, the number of cache sites for any individual file or directory is potentially fluid, based on bottleneck conditions.

In an example, once a cache is established, that cache is used unless and until the group topology is changed. Because the cost of establishing and revoking caches is high, once a particular member is deployed as a cache for a certain file or directory, that same mapping should be used long enough to benefit from that cache. For example, if a cache of a file is established on Member B, then as long as the condition that triggered the establishment of the cache continues that same cache member (Member B) is used rather than, for example, performing periodic computations (e.g., every 30 seconds) and each time and possibility determining that a different member (e.g., Member C, Member D) should be used instead as a cache.

The approach described above is useful when a cache is established on a member (e.g., Member B) and some period of time (e.g., 30 seconds) later Member B suffers from its own bottleneck(s). The straightforward solution may be to pull back from pressuring it with the newer load and instead designate some different member (e.g., Member C, Member D) to assist. Thus, there may be conflicting goals: first, to benefit from caches long-term, and, second, to attain roughly even activity on all members (e.g., relieving over-active members by routing traffic to under-active members). In the approaches described below, conceptually, preference is given to reusing existing caches as long as is not harmful, but those caches can be replaced/deactivated in favor of using different topologies as traffic flows change.

FIG. 1 illustrates one embodiment of block diagram of a plurality of nodes interconnected as a cluster. The cluster of nodes illustrated in FIG. 1 can be configured to provide storage services relating to the organization of information on storage devices. Further, the cluster of nodes illustrated in FIG. 1 can be managed utilizing the load distribution and caching strategies described herein.

The nodes of FIG. 1 (e.g., node 104, node 106) include various functional components that cooperate to provide a distributed storage system architecture of cluster 100. To that end, each node is generally organized as a network element (e.g., network element 108 in node 104, network element 110 in node 106) and a disk element (e.g., disk element 112 in node 104, disk element 114 in node 106). In the subsequent figures and description, network element 108 and network element 110 (or comparable components) can also be referred to as N-Blades. Similarly, disk element 112 and disk element 114 (or comparable components) can be referred to as D-Blades. Network elements provide functionality that enables the nodes to connect to client(s) 102 over one or more network connections (e.g., 118, 120), while each disk element connects to one or more storage devices (e.g., disk 134, disk array 146).

In the example of FIG. 1, disk element 112 connects to disk 134 and disk element 114 connection to 146 (which includes disk 144 and 148). Node 104 and node 106 are interconnected by cluster switching fabric 116 which, in an example, may be a Gigabit Ethernet switch. It should be noted that while there is shown an equal number of network and disk elements in cluster 100, there may be differing numbers of network and/or disk elements. For example, there may be a plurality of network elements and/or disk elements interconnected in a cluster configuration that does not reflect a one-to-one correspondence between the network and disk elements. As such, the description of a node comprising one network elements and one disk element should be taken as illustrative only.

Client(s) 102 may be general-purpose computers configured to interact with node 104 and node 106 in accordance with a client/server model of information delivery. That is, each client may request the services of a node, and the corresponding node may return the results of the services requested by the client by exchanging packets over one or more network connections (e.g., 118, 120).

Client(s) 102 may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

Disk elements (e.g., disk element 112, disk element 114) are illustratively connected to disks that may be individual disks (e.g., disk 134) or organized into disk arrays (e.g., disk array 146). Alternatively, storage devices other than disks may be utilized, e.g., flash memory, optical storage, solid state devices, etc. As such, the description of disks should be taken as exemplary only. As described below, in reference to FIG. 11, a file system may implement a plurality of flexible volumes on the disks. Flexible volumes may comprise a plurality of directories (e.g., directory 124, directory 136) and a plurality of subdirectories (e.g., sub 128, sub 140, sub 150, sub 152, sub 154). Junctions (e.g., junction 126, junction 130, junction 138) may be located in directories and/or subdirectories. It should be noted that the distribution of directories, subdirectories and junctions shown in FIG. 1 is for illustrative purposes. As such, the description of the directory structure relating to subdirectories and/or junctions should be taken as exemplary only.

Figure 2:
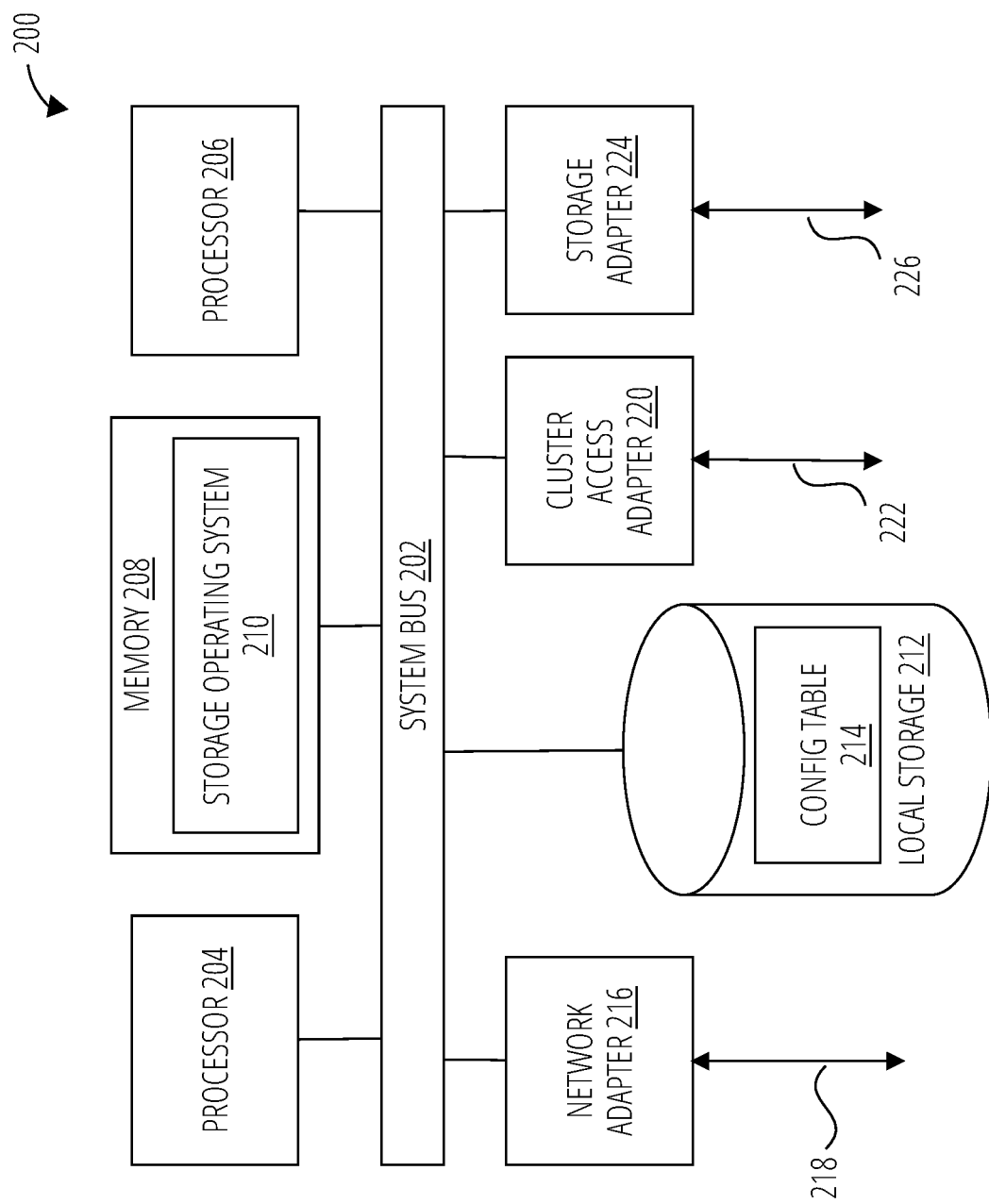
FIG. 2 illustrates one embodiment of a block diagram of a node.

FIG. 2 illustrates one embodiment of a block diagram of a node. Node 200 can be, for example, node 104 or node 106 as discussed in FIG. 1. The nodes illustrated in FIG. 2 can be managed utilizing the rebalancing strategies (e.g., rebalancing engine(s), rebalancing scanner(s), non-disruptive move mechanism) described herein.

In the example of FIG. 2, node 200 includes processor 204 and processor 206, memory 208, network adapter 216, cluster access adapter 220, storage adapter 224 and local storage 212 interconnected by 202. In an example, local storage 212 can be one or more storage devices, such as disks, utilized by the node to locally store configuration information (e.g., in config table 214).

Cluster access adapter 220 provides a plurality of ports adapted to couple node 200 to other nodes (not illustrated in FIG. 2) of a cluster. In an example, Ethernet is used as the clustering protocol and interconnect media, although it will be apparent to those skilled in the art that other types of protocols and interconnects may be utilized within the cluster architecture described herein. Alternatively, where the network elements and disk elements are implemented on separate storage systems or computers, cluster access adapter 220 is utilized by the network element (e.g., network element 108, network element 110) and disk element (e.g., disk element 112, disk element 114) for communicating with other network elements and disk elements in the cluster.

In the example of FIG. 2, node 200 is illustratively embodied as a dual processor storage system executing storage operating system 210 that can implement a high-level module, such as a file system, to logically organize the information as a hierarchical structure of named directories, files and special types of files called virtual disks (hereinafter generally "blocks") on the disks. However, it will be apparent to those of ordinary skill in the art that node 200 may alternatively comprise a single or more than two processor system. In an example, processor 204 executes the functions of the network element on the node, while processor 206 executes the functions of the disk element.

In an example, memory 208 illustratively comprises storage locations that are addressable by the processors and adapters for storing software program code and data structures associated with the subject matter of the disclosure. The processor and adapters may, in turn, comprise processing elements and/or logic circuitry configured to execute the software code and manipulate the data structures. Storage operating system 210, portions of which is typically resident in memory and executed by the processing elements, functionally organizes node 200 by, inter alia, invoking storage operations in support of the storage service implemented by the node. It will be apparent to those skilled in the art that other processing and memory means, including various computer readable media, may be used for storing and executing program instructions pertaining to the disclosure described herein.

Illustratively, storage operating system 210 can be the Data ONTAP® operating system. However, it is expressly contemplated that any appropriate storage operating system may be enhanced for use in accordance with the inventive principles described herein. In an example, the ONTAP operating system can provide (or control the functionality of) the rebalancing engine and/or the rebalancing scanner as described herein.

In an example, network adapter 216 provides a plurality of ports adapted to couple node 200 to one or more clients (e.g., client(s) 102) over one or more connections 218, which can be point-to-point links, wide area networks, virtual private networks implemented over a public network (Internet) or a shared local area network. Network adapter 216 thus may include the mechanical, electrical and signaling circuitry needed to connect the node to the network. Illustratively, the computer network may be embodied as an Ethernet network or a Fibre Channel (FC) network. Each client may communicate with the node over network connections by exchanging discrete frames or packets of data according to pre-defined protocols, such as TCP/IP.

In an example, to facilitate access to disks, storage operating system 210 implements a write-anywhere file system that cooperates with one or more virtualization modules to "virtualize" the storage space provided by the disks. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (LUNs).

In an example, storage of information on each array is implemented as one or more storage "volumes" that comprise a collection of physical storage disks cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

Storage adapter 224 cooperates with storage operating system 210 to access information requested by the clients. The information may be stored on any type of attached array of writable storage device media such as video tape, optical, DVD, magnetic tape, bubble memory, electronic random-access memory, micro-electromechanical and any other similar media adapted to store information, including data and parity information. However, as illustratively described herein, the information is stored on disks or an array of disks utilizing one or more connections 222. Storage adapter 224 provides a plurality of ports having input/output (I/O) interface circuitry that couples to the disks over an I/O interconnect arrangement, such as a conventional high-performance, CF link topology.

Figure 3:
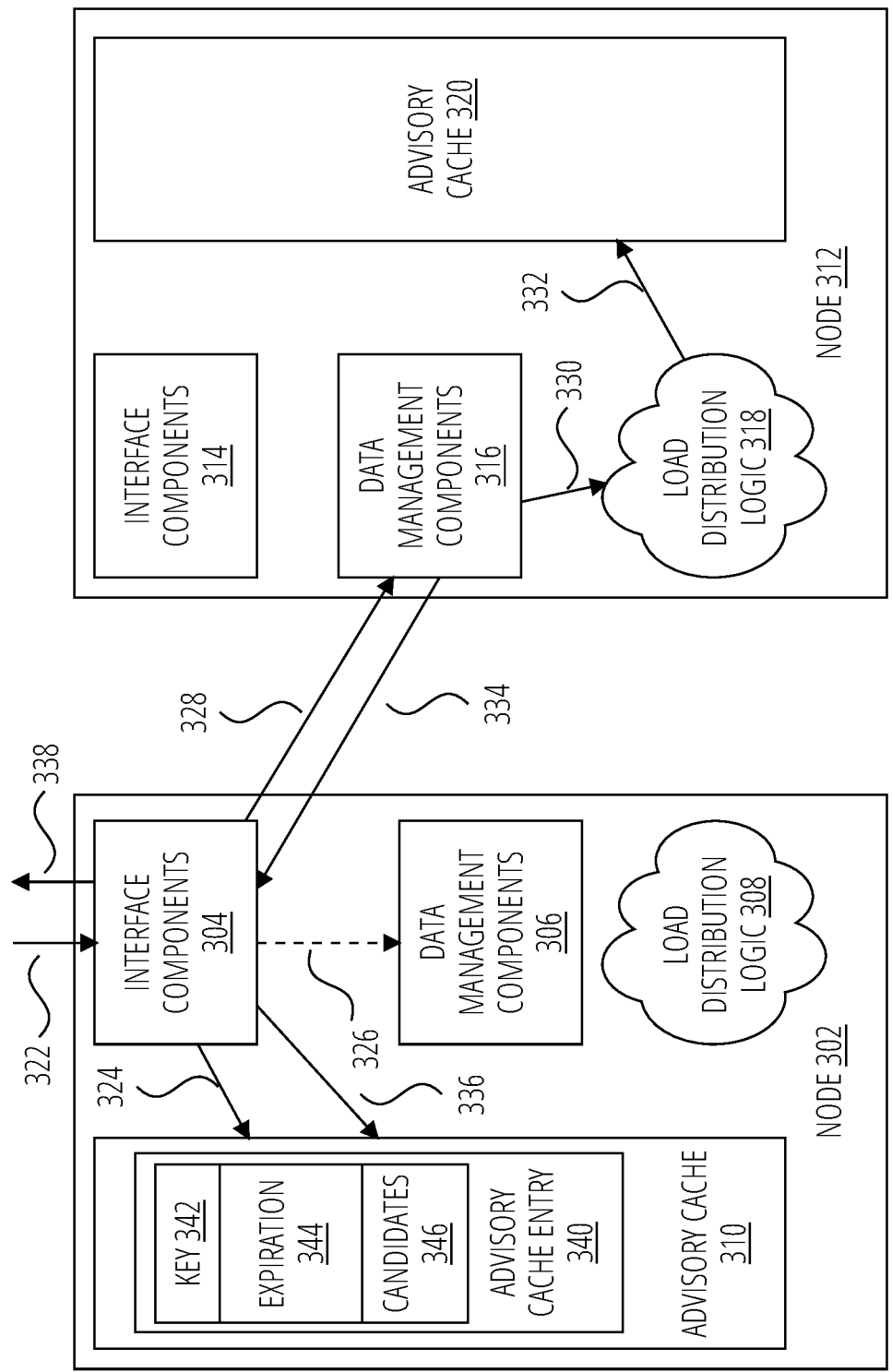
FIG. 3 is an example block diagram of components to provide load sharing and caching.

FIG. 3 is an example block diagram of components to provide load sharing and caching. The example of FIG. 3 illustrates two nodes (e.g., node 302, node 312); however, any number of nodes can be supported to provide the load distribution and caching functionality described herein.

In general, the interface components (e.g., interface components 304, interface components 314) of a node handle receiving requests from external devices (e.g., other nodes) and provides some initial processing of the request, which will be described in greater detail below. The data management components (e.g., data management components 306, data management components 316) operate on information and data from the interface components, advisory caches (e.g., advisory cache 310, advisory cache 320) and load distribution logic (e.g., load distribution logic 308, load distribution logic 318) to provide the bottleneck detection and corresponding load distribution techniques described herein.

As a simple example, node 302 can receive inbound request 322 (e.g., a read request) through interface components 304. Interface components 304 can perform some translation, if necessary, and generate an initial routing decision based on, for example, an inbound file handle and/or other information. In an example, interface components 304 can receive inbound request 322 and determine a member volume, or node, to service the request. The selected member volume is generally the member volume that would service the request when the load distribution mechanisms described herein are not active. In an example where no advisory cache entry corresponding to inbound request 322 exists, the request can be forwarded (e.g., request 326) to data management components 306 to be serviced by the local node (e.g., node 302).

Figure 10:
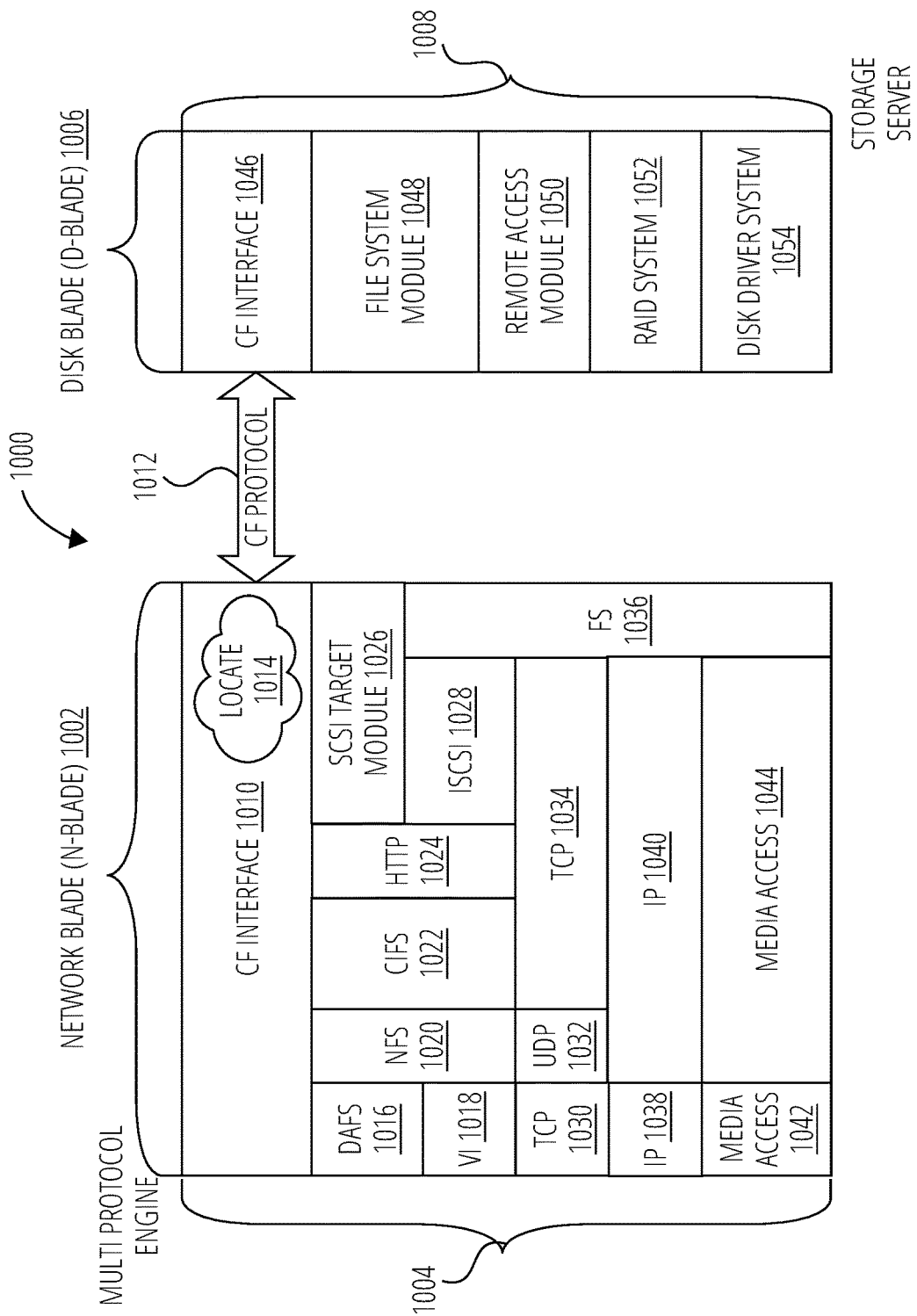
FIG. 10 illustrates one embodiment of a block diagram of a storage operating system.

Interface components 304 and interface components 314 can also be referred to as N-Blades (e.g., network blade (N-Blade) 1002 as illustrated in FIG. 10), which can be part of a multi-protocol engine (e.g., multi protocol engine 1004) described in detail in FIG. 10.

In an example, before sending the request from interface components 304 to the selected member volume (e.g., data management components 306), advisory cache 310 is consulted (e.g., via advisory cache check 324) to determine if there is an "advisory" in place for handling the file for load distribution purposes. In an example, 310 can provide a list of allowable cache volumes that can be employed in accordance with the current load distribution strategy and interface components 304 can select from the list (e.g., candidates 346) to service inbound request 322.

Data management components 316 and data management components 306 can also be referred to as D-Blades (e.g., disk blade (D-Blade) 1006 as illustrated in FIG. 10), which can also be part of the multi-protocol engine described in FIG. 10.

Interface components 304 sends the request (e.g., request 328) to data management components 316 based on the advisory cache entry 340, if it corresponds to inbound request 322, or based on another initial routing decision. For example, in a complex system having more than two nodes, the initial routing decision my indicate a node other than node 302 or node 312 (which is not illustrated in FIG. 3).

In an example, in response to receiving request 328, data management components 316 can detect hot spots to determine whether the file (or directory) being accessed for request 328 is becoming problematic by accessing load distribution logic 318. In general, load distribution logic 318 monitors the components of node 312 to determine if a bottleneck is developing or currently exists. Operation of load distribution logic 318 (and similarly, load distribution logic 308) is described in greater detail below with respect to, for example, one-to-one mappings, one-to-many mappings, cost evaluations, etc. While load distribution logic 318 is illustrated as separate from data management components 316, in some embodiments, load distribution logic 318 may be integrated within data management components 316.

If load distribution logic 318 determines a bottleneck exists and/or is likely to happen, load distribution logic 318 will update advisory cache 320 for the corresponding file(s) and/or directory (ies). Information stored in advisory cache 320 can be, for example, potential alternate nodes to service the request, conditions/parameters corresponding to the bottleneck, updates to be applied to advisory cache 310 for the subject file and/or directory through an example process described below. Additional and/or different information can also be stored in advisory cache 320.

In an example, before routing a request (e.g., request 328) to a data management component (e.g., data management components 316) the interface components (e.g., interface components 304) consult the local advisory cache (e.g., advisory cache 310). In an example, the advisory cache is accessed by performing a hash table lookup against the file handle to discover if an advisory exists for the file. Other cache access techniques can also be supported.

If the interface components find that an advisory cache entry exists, information from the advisory cache entry is used to service the request. In an example, if an advisory cache entry exits for a file or directory, a random number can be selected to walk the array of available caches from the advisory cache entry and the selected cache (and corresponding volume) becomes the target volume for the request. Using a random number against a fixed probability assigned to each entry in the candidates list is one example of doing probabilistic selection. Alternatively, a deterministic consultation, for example, by keeping a cumulative value in the advisory cache entry itself and increasing it by some amount each time a "hit" is encountered; that value, modulo the probability, would allow detection of which candidate should be used. There are other techniques that could be used as well.

In an example, probabilistic selection allows the advisory cache to ensure that the specified percentage allocations are applied. For example, the advisory cache entry can designate that 25% of requests go to a first cache and 75% of requests go to a second cache. Use of this approach results in the interface components not making any meaningful decisions regarding the use of caching. Instead, the interface components follow directions laid out by the advisory cache structure and entries.

Data management components 316 service request 328 using resources of node 312 and generates response 334 to be transmitted to interface components 304. In an example, response 334 can include some or all of the advisory information that is stored in advisory cache 320. This advisory information from response 334 can be used to update advisory cache 310. As illustrated in FIG. 3, interface components 304 can update advisory cache 310 via advisory cache update 336.

In an example, the advisory data (e.g., as stored in advisory cache 310 and/or advisory cache 320) utilizes a data structure that stores and provides information on how a corresponding file or directory should be cached. In an example, these structures are generated by the data management components (e.g., data management components 306, data management components 316) and are returned to the interface components (e.g., interface components 304, interface components 314) that cache the information in the advisory caches (e.g., advisory cache 310, advisory cache 320). As described above, the interface components consult the advisory caches when routing subsequent request traffic. Each advisory cache can maintain any number of cache entries.

In an example, an advisory cache entry includes a key, an expiration and a list of candidate caches. In alternate configurations, advisory cache entries can include additional and/or different information. In the example, of FIG. 3, advisory cache entry 340 includes key 342, expiration 344 and candidates 346. Key 342 stores information that identifies the corresponding file or directory. In an example, key 342 can include file identifiers, snapshot identifiers, file system identifiers, generation information, version information, etc.

Advisory cache entry 340 can also include expiration 344 information. The expiration corresponds to a time during which advisory cache entry 340 is valid and is to be used in the manner described. In an example, expiration 344 can be defined in terms of minutes (e.g., 3 minutes, 5 minutes, 1 minute); however, alternate time scales (e.g., 30 seconds, one hour, 90 seconds, one day) can also be used. In an example, if advisory cache entry 340 is accessed after it expires it will be discarded from the advisory cache.

Advisory cache entry 340 can further include candidates 346, which provides a list of potential caches to be used. In an example, candidates 346 is a limited-capacity array (e.g., 6 to 8 entries) that indicate caches that can be used to service a request to the corresponding file or directory. In an example, candidates 346 further indicates a target percentage for each target cache, which can be used to distribute the load for a file to multiple caches in a proportionate manner. Additional and/or different characteristics can also be included in candidates 346.

In an example, the advisory cache is a global data structure that is maintained by, for example, the storage operating system (e.g., storage operating system 210). In alternate configurations, the advisory cache can be maintained using a different approach that use different cache architectures. In an example the advisory cache is relatively small with a capacity based on the host platform and/or other parameters. In an example, overflow of the advisory cache beyond its maximum capacity causes older cache entries to be discarded based on, for example, a least recently used (LRU) or similar algorithm.

In an example based on the ONTAP operating system, because the advisory cache is part of the platform global space, the advisory cache is accessible by both interface components and data management components. Also, in the ONTAP operating system example, the advisory cache may be accessible via use of spinlocks to guard against concurrent accesses. In general, a spinlock is a lock that causes a thread trying to acquire the lock to wait in a loop (or "spin") while periodically checking whether the lock is available. Once acquired, spinlocks can be held until explicitly released, although in some implementations they may be automatically released. More generally, access to the cache could be controlled through a mutex or other concurrency signaling mechanism. A spinlock is a specific form of mutex. The particular concurrency control mechanism is, of course, exemplary only; as even a lockless data structure like a versioned table for the cache could be utilized.

In an example, the cache entry expiration is stored as two values: a configuration delay (which may be a fixed value) that is associated with the cache entry at the time of creation; and a wall clock expiration (which may be a variable value) that is initialized at the time of creation to the current time plush the configuration delay. In an example, when the interface components access an existing advisory cache entry, the wall clock time is reset to the current time plus the configured delay. The advisory cache entry is expired only if the current time has advanced beyond the advisory cache entry expiration time.

The two-value example described above provides two behaviors: an advisory cache entry that, once issued, remains in effect so long as a stream of traffic continues to encounter the advisory cache entry without a break (as defined by the expiration parameters); and the caching duration can be dynamically managed.

In the example illustrated in FIG. 3, the load distribution logic generates the advisory cache entries to be used as described above by the interface components and the data management components. As illustrated in FIG. 3, the load distribution logic can be external to the data management components; however, in alternate configurations, the load distribution logic can be part of the data management components.

In an example, the load distribution logic can build and maintain two models: one inactive model that is being built and one that has been built and is in active use. In an example, building a new model occurs over a fixed period of time: a window during which activity is measured and the model's contents are populated. In an example, the duration of the measurement window is fixed by configuration (e.g., ~30 sec to 1 min in time). As each window comes to an end, the now-completed model becomes active, and the older model it replaces is reset to inactive state and is used to begin building a fresh new model during the next window. In this way the load distribution logic is constantly building a fresh model for the future, while acting on the prior model that was recently completed (e.g., within the last minute). Conceptually, the load distribution logic model retains two categories of information: activity levels for each member volume and a counting bloom filter representing file activity. These categories of information and the use thereof is described in greater detail below.

In an example, if the local member volume has an activity level that's not above some high-water mark (e.g., ~10% above the average), new cache advisories entries are not generated. Traffic that is off-loaded will be sent to a different member volume, so if the local member volume is presently better able to handle extra traffic than peer volumes, the traffic remains with the local member volume. In an example, there may also be some hysteresis involved in that a bottleneck may be forming for which an advisory is issued, which causes the workload to decrease. In an example, if the local member volume activity level is high (e.g., above average) then new advisories can be issued, while if the activity level of the local member volume is not yet low (e.g., below average) advisories that are already in place are refreshed.

Using these criteria, a file/directory that is part of a bottleneck that is impacting the local volume ability to serve traffic can be identified and at least a portion of the traffic can be offloaded to another volume. In an example, a "points" based approach is used to decide how aggressively to encourage caching. In an example, the "points" value corresponds to the local volume's activity level beyond the average, multiplied by the file's particular access percentile. For example, an operation is received against a file, and on looking up the file handle against the current counting bloom filter model, it has a raw access count of 60 and an access percentile of 75% (because the peak bucket count in the model's counting bloom filter was 80). If the local member volume activity level is 3.8 and the local member volume average activity level is 2.3, then 3.8-2.3=1.5 difference and multiply it by the 75% access percentile, to arrive at 1.125 "points."

In an example, the greater the number of points for a file/directory indicates a file that will be cached more aggressively, probably on several different member volumes. Computing fewer but nonzero points indicates that the file/directory likely needs to be cached on a smaller number of other member volumes, possibly only one other member volume.

Returning to the bottlenecked member volume above, the local member volume has an activity level of 3.8 against the average activity level of 2.3 ms. The units in the example are ms of queuing latency; however, any other latency measure could be used. More generally, any other metric can be used.

In an example, if this bottleneck is the result of exactly one file that is being flooded with requests (e.g., it is responsible for 10,000 raw access count out of the most recent 12,500 total requests) a request to service that file/directory handle and look it up in the active model counting bloom filter. Continuing the example, the counting bloom filter indicates that the file/directory has a raw access count of 10,000 and its access percentile is 80% (10 k/12.5 k), which results in (3.8-2.3=1.5)*80% or 1.2 points for the file/directory.

If the bottleneck is instead the result of 10 different files, all equally busy but collectively producing the same 10,000 actual raw accesses over the previous window out of 12,500 total requests, so the overall load on the volume is the same. When a request from any one of these 10 files received and a look up by the file handle the to the current model bloom filter, it has a raw access count of 1,000 and its access percentile is 1000/12,500=8%. Thus, each file is allocated (3.8-2.3=1.5)*8%=0.12 points.

If a nonzero point value is computed for a file/directory, then an advisory (e.g., advisory cache entry 340) for it is issued for it. In an example, the advisory uses the file handle to as a key (e.g., key 342), and will also apply an expiration time or validity window (e.g., expiration 344). In an example, the advisory will also include an array of the particular member volumes that should serve as caches (e.g., candidates 346), which can also include percentages of traffic that to be directed to each cache.

Consider a situation where one member volume that is very "hot" (in terms of points evaluation) and should give away some of its traffic. The member volume was considered hot because its activity level was above average, which, by definition, means that one or more other member volumes have activity levels that are below average. For example, there might be exactly one other member volume that is almost idle to compensate for the local member volume being hot, and all other member volumes are at (or near) the average activity level. In this situation, some of the traffic is offloaded to the idle volume exclusively. Or in another situation, all other member volumes might have exactly the same (or similar) activity level (e.g., a value that is below average) only because the local member volume has such a high usage value. In this latter case, a little caching load can be shifted onto each of the other member volumes (e.g., roughly equally if possible).

Conceptually, each below-average-activity-level member volume can absorb a number of points equal to the average activity level minus its own activity level. Thus, once the points have been computed for a particular file, other member volumes that can absorb some points can be enumerated and included in the cache advisory entry (e.g., advisory cache entry 340) as candidate volumes (e.g., candidates 346).

In the example where the single member volume was idle, that idle member volume will be able to absorb as many points as the local active member volume may be able to charge. Therefore, in this case, as soon as that member volume is identified, the idle member volume will be able to accommodate all of the traffic to be offloaded (and the candidates list will be just the idle member volume) regardless of how many points are assigned for caching the file. In an example where all other volumes are equally busy and each is only slightly below the average activity level, all of the other member volumes might be employed as caches before finding enough entries to accommodate all of the computed points. In an example, if the file that to be cached elsewhere has only a small number of points, it's likely that the very first below-average-activity-level member volume found will be able to accommodate all of the points, and so only a single caching volume will be required for that file.

In an example, as the array of candidate caching member volumes is built for the advisory, each entry in the array will include the total number of points that it has absorbed. In an example, when the enumeration is finished, those values will be divided by the total number of points absorbed forming a percentile for how much traffic is to be directed to each volume. Thus, if caching on several member volumes, the member volumes that are more idle than their peers will receive a proportionally higher amount of traffic requests for caching.

In an example, when analyzing the list of member volumes to identify which ones can absorb points for caching a file, the enumeration can start with a member index that is offset by a hash of the file handle and loop around once. For example, if 100 files are to be cached and each need only a small amount of points' worth of caching, it is likely that the caching requirements will be evenly distributed across available member volumes and the caching responsibilities will be apportioned to those member volumes based on how much additional traffic they are likely to be able to absorb.

Figure 4:
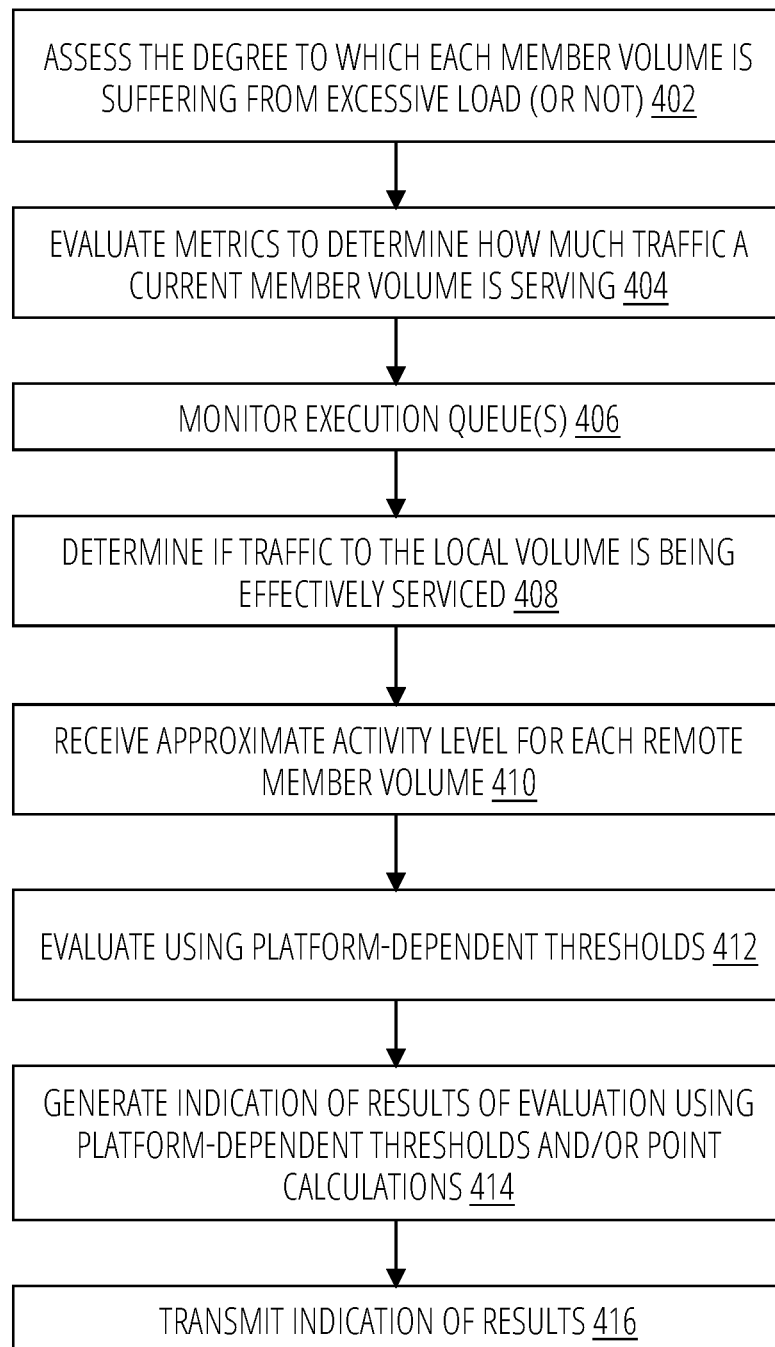
FIG. 4 is a flow diagram corresponding to an example approach to measuring activity levels that can be utilized for managing load sharing and caching.

FIG. 4 is a flow diagram corresponding to an example approach to measuring activity levels that can be utilized for managing load sharing and caching. The first task of the load distribution logic generated model is to assess the degree to which each member volume is suffering from excessive load (or not), block 402. Conceptually, the point of load sharing is, in essence, to direct some traffic away from member volumes that are over-loaded and towards member volumes that are under-loaded. Therefore, in an example, the load distribution logic begins by classifying the load levels on the various volumes, in order to discriminate between volumes that need to yield traffic and those which can absorb more. The numeric value of this activity level—whatever its source or units—is useful but not necessarily particularly crucial: a high value represents a volume that is (relatively) busy and a low value represents a volume that is (relatively) not, such that volumes with high values should reduce their traffic and volumes with low values are in comparison able to tolerate more traffic.

There are many available metrics that can be used to determine how much traffic a member volume has been serving, block 404. However, it should be noted that various operations require different amount of effort on the volume's behalf. In an example, a wide variety of metrics can be considered and hashed together to judge whether volume A or volume B is more "busy." However, the more complex the computation the more likely it is that some other variable is missed and/or misconfiguring some weighting. So, in the examples described, a volume's activity level can be evaluated by observing a direct proxy value: message queuing latency. In alternate examples, other proxy values or combinations of values can be used. The message queueing latency is the amount of time that elapses between when a message is enqueued for execution, and the time when that message is dequeued and begins executing. In a "healthy" volume this value is close to zero, but when traffic is becoming backlogged, the queue latency can become quite large.

A volume can have many available execution queues. In an example, while building its next model, the load distribution logic monitors the maximum queue latency that it observes for any message on any queue that is serviced on behalf of a particular member volume, block 406. In an example, at the end of the observation window, this maximum observed value is the metric that will be considered the representative activity level for that volume. In an example, if one queue that services the volume develops a problem, the whole volume will be considered to have a problem. While that approach may be overly pessimistic in general, selecting which files to cache and which not to will refine caching behavior to address any over-reach at this stage.

Determine whether or not traffic to the volume is being effectively serviced in a reasonable period of time, block 408. If it is not, then traffic for this volume is probably better served by some other volume instead.

In an example, data management components can only directly measure the activity levels for member volumes of its own node, because the data management components will only receive traffic for that subset of member volumes. In an example, to build a picture of collective activity levels on all member volumes, an approximate activity level for each member can be exchanged between member volumes, block 410. In an example, this information is exchanged continuously at a pre-selected (e.g., ~1 sec., ~3 sec.) cadence. Additional information (e.g., recent operation rates, current free space, ingestion information) can also be exchanged using the same infrastructure.

These exchanged activity levels are the result of short (~5 sec) sliding-window views of recently observed queuing latencies on each member: the highest queuing latency observed in the window is transmitted as representative, and as the load distribution logic builds a model based on the highest value received for each remote member during its observation window. In this way, each model will attain a pessimistic view of the queuing latency for all members in the group, depicting realistically which volumes appear to be struggling to serve traffic and which are not. However, exchanged activity levels can take many other forms as well.

Because the queuing latency is a directly meaningful quantity itself (e.g., as opposed to a weighted hash of a series of different metrics), platform-dependent thresholds can be applied to evaluate the latency, block 412. For example, values under X ms could be considered healthy, while values over Y ms can be considered problematic. And an average of the observed activity levels for all member volumes, which value will be stored with the model, and which will feature prominently in the subsequent steps.

The load distribution logic (or other platform components) generates an indication of results of the evaluation process described above, block 414. In an example, the points approach described above is used to decide how aggressively to encourage caching. In an example, the points value corresponds to the local volume's activity level beyond the average, multiplied by the file's particular access percentile. Alternate approaches can be utilized to determine a points value to be applied. In an example, the greater the number of points for a file/directory indicates a file that will be cached more aggressively, probably on several different member volumes. In an example, a lower number of points indicates that the file/directory is be cached on a smaller number of other member volumes.

In an example, if the load on a member volume continues to be higher than average even after issuing advisory cache entries, the node can apply a slowly growing cumulative "bonus" to the point computations to increase the rates of caching until the load begins to level out. In an example, a bonus could also be used to decrease the thresholds at which caching is employed.

In a more complex example, the cumulative component can be treated as the integral component in a Proportional-integral-derivative (PID) controller: basic point assignment is the Proportional component, this cumulative error represents Integral. Therefore, the Derivative component could be based on if the load imbalance is improving, then the rate of points being given out could be dampened to help mitigate oscillation.

In an example, there can be discrete levels of volume activity at which advisories are generated, for example, at a minimum threshold the issuing volume must have an above-average activity level divided into multiple (e.g., three, six, eight) regions (e.g., a significantly higher-than-average level is required to issue new advisories, while an activity level that's below some minimum value might cause the node to actively revoke some or all of its existing advisories to try to draw traffic back to itself).

The indication (e.g., a point total) is then transmitted to one or more components (e.g., advisory cache, remote node, advisory cache on a remote node), block 416.

Figure 5:
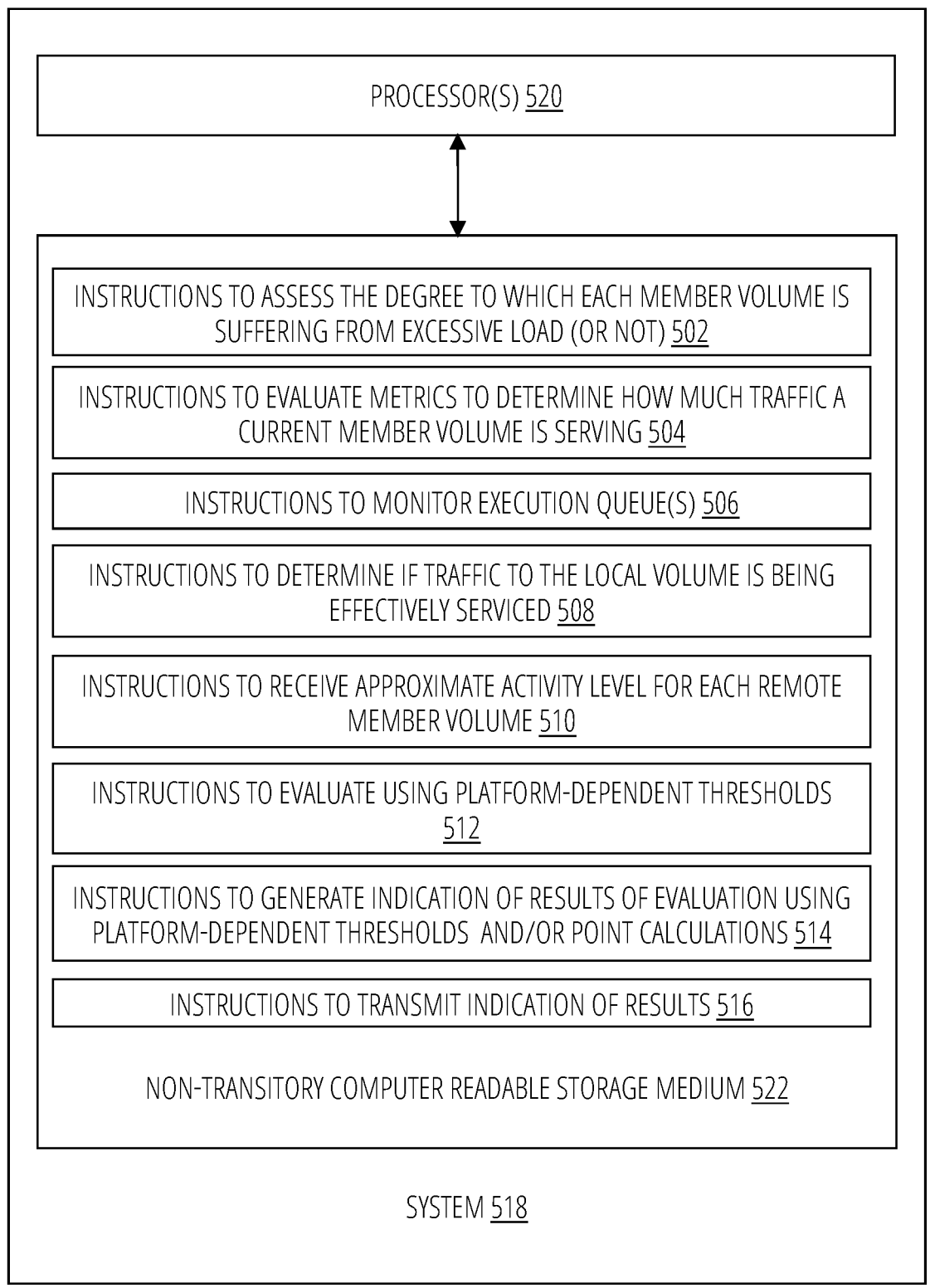
FIG. 5 illustrates an example system to provide an approach to measuring activity levels that can be utilized for managing load sharing and caching.

FIG. 5 illustrates an example system to provide an approach to measuring activity levels that can be utilized for managing load sharing and caching. In an example, system 518 can include processor(s) 520 and non-transitory computer readable storage medium 522. In an example, processor(s) 520 and non-transitory computer readable storage medium 522 can be part of a node having a storage operating system that can provide some or all of the functionality of the ONTAP software as mentioned above.

Non-transitory computer readable storage medium 522 may store instructions 502, 504, 506, 508, 510, 512, 514 and 516 that, when executed by processor(s) 520, cause processor(s) 520 to perform various functions. Examples of processor(s) 520 may include a microcontroller, a microcontroller, a microprocessor, a central processing unit (CPU), a graphics processing unit (GPU), a data processing unit (DPU), an application-specific integrated circuit (ASIC), a field programmable gate array (FPGA), a system on a chip (SoC), etc. Examples of non-transitory computer readable storage medium 522 include tangible media such as random-access memory (RAM), read-only memory (ROM), electrically erasable programmable read-only memory (EE-PROM), flash memory, a hard disk drive, etc.

Instructions 502 cause processor(s) 520 to assess the degree to which each member volume is suffering from excessive load (or not). As discussed above, the point of load sharing is to direct traffic away from member volumes that are over-loaded and towards member volumes that are under-loaded. In an example, instructions 502 cause processor(s) 520 to classify load levels on the various volumes in order to discriminate between volumes that need to yield traffic and those which can absorb more. Various classifications can be used, for example, high-load/low-load, high-load/medium-load/low-load, extreme-load/high-load/medium-high-load/medium-low-load/low-load/no-load, etc.

Instructions 504 cause processor(s) 520 to collect, calculate and/or evaluate various metrics that can be used to determine how much traffic a member volume has been serving. In an example, a wide variety of metrics can be considered and hashed together. In the examples described, a volume's activity level can be evaluated by observing a direct proxy value: message queuing latency. In alternate examples, other proxy values or combinations of values can be used. The message queueing latency is the amount of time that elapses between when a message is enqueued for execution, and the time when that message is dequeued and begins executing. In an example, the greater the latency the greater the corresponding load. Various thresholds can be used to achieve classifications using the categories described above.

Instructions 506 cause processor(s) 520 to monitor the queue latency of one or more execution queues for any message on any queue that is serviced on behalf of a particular member volume. In an example, at the end of the observation window, this maximum observed value is the metric that will be considered the representative activity level for that volume. In an example, if one queue that services the member volume develops a problem, the whole volume will be considered to have a problem. In other configurations, individual queues may be handled independently rather than as an indication of the member volume as a whole.

Instructions 508 cause processor(s) 520 to determine if traffic to the member volume is being effectively serviced based on the queue latency information. If a volume is slowing because the volume is the victim of some other process that is consuming processor resources, memory, network, or disk bandwidth, the queue latency metric will increase. Similarly, if the volume is the source of the congestion problem and cannot keep up with its own traffic, the queue latency will indicate a problem. As discussed above, the cause of the congestion is not important when using the advisory cache approach described herein. Thus, the network traffic rates and disk throughput rates (and similar metrics) do not need to be measured if there can be a determination of whether or not traffic to the volume is being effectively serviced in a reasonable period of time based on queue latency.

Instructions 510 cause processor(s) 520 to build a picture of collective activity levels on all member volumes, an approximate activity level for each member can be exchanged between member volumes. Because data management components only directly measure the activity levels for member volumes of its own node, in an example, the data management components receive traffic for that subset of member volumes and this information can be exchanged continuously at a pre-selected (e.g., ~1 sec., ~3 sec.) cadence, if desired. Additional information (e.g., recent operation rates, current free space, ingestion information) can also be exchanged using the same infrastructure. In an example, the highest queuing latency observed in the window is transmitted as representative, and a model is built based on the highest value received for each remote member during its observation window.

Instructions 512 cause processor(s) 520 to apply platform-dependent thresholds can be applied to evaluate the latency. For example, values under X ms could be considered healthy, while values over Y ms can be considered problematic for a first volume, and values under (x+10) ms could be considered healthy, while values over 2Y ms can be considered problematic for a second volume.

Instructions 514 cause processor(s) 520 to generates an indication of results of the evaluation process described above. The indication of the results can be, for example, the measured latency values, the difference between the latency values and the thresholds, information to start an advisory cache entry and/or information to be stored in advisory cache entry. Instructions 516 cause processor(s) 520 to cause the indication to be transmitted to one or more components.

Figure 6:
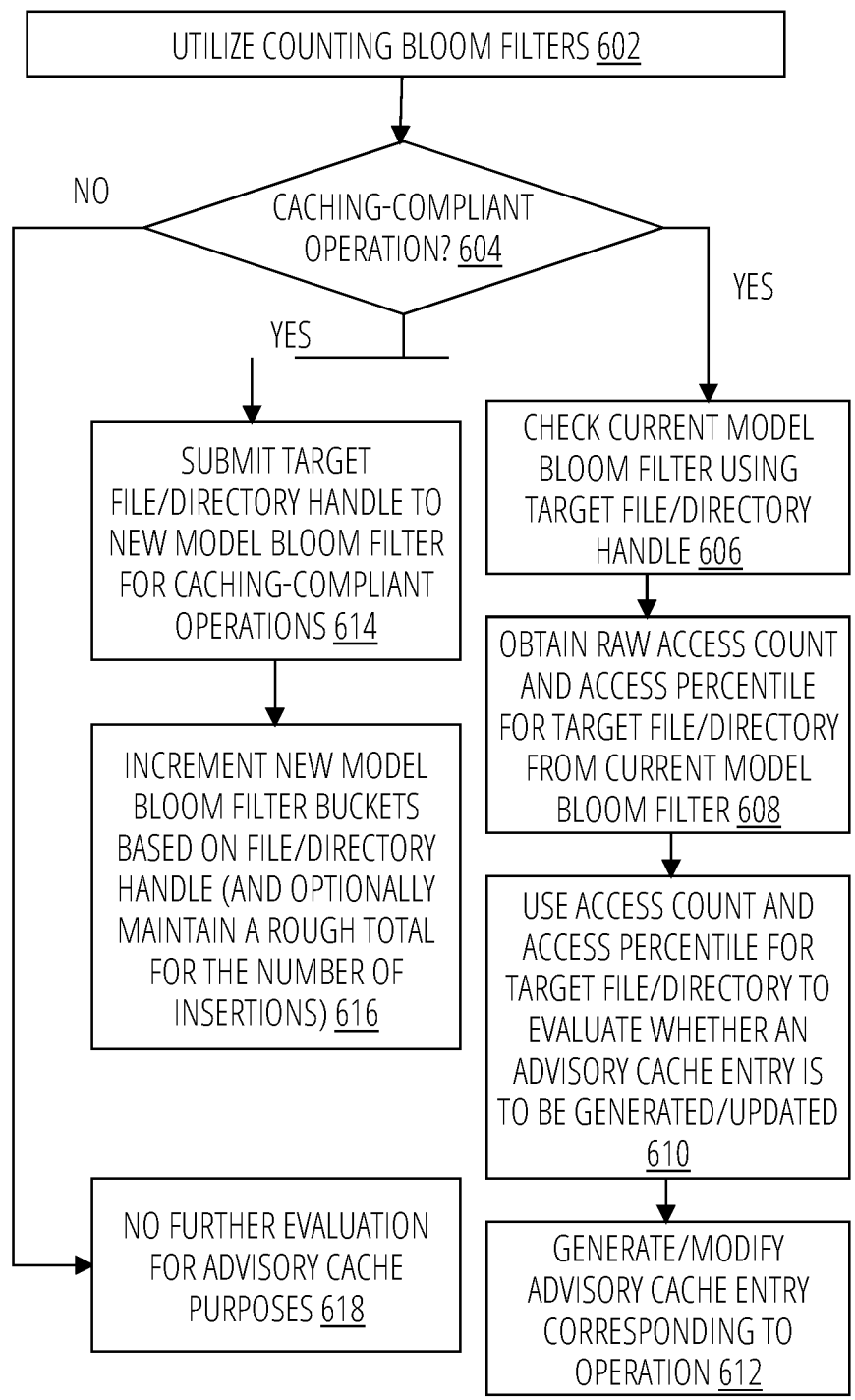
FIG. 6 is a flow diagram corresponding to an example approach to identifying which file(s) and/or directory/directories are contributing to observed traffic bottlenecks.

FIG. 6 is a flow diagram corresponding to an example approach to identifying which file(s) and/or directory/directories are contributing to observed traffic bottlenecks. In an example, the approach of FIG. 6 is performed in response to the indication generated (and possibly transmitted) as described with respect to FIG. 4.

In an example, the load distribution logic implements a counting bloom filter, block 602. In an example, the bloom filter is a typical bloom filter (e.g., k=4 with a collection of four distinct hash algorithms), except that every cell in the filter is an unsigned integer rather than a single bit. In other implementations, different bloom filter configuration can be utilized.

The target operation is evaluated to determine whether it is a caching-compliant operation, decision block 604. In an example, a caching-compliant operation is one that meets the following three criteria: 1) the operation is running against a file or directly that exists on the local volume (i.e., is not a caching operation); 2) the operation is one for which the data management components will later consult the advisory cache; and 3) the primary file or directory involved has an initiation time that is behind the wall clock time (to avoid interfering with intermittent RW/RO traffic). In alternate configurations, additional and/or different criteria can be used for evaluating a caching-compliant operation.

As illustrated in FIG. 6, while building a new model each file handle encountered (within a caching-eligible operation) is inserted into the new model's bloom filter (e.g., block 614, block 616). Similarly, while serving each file operation, the cache-eligible file handle is passed to the active model bloom filter (e.g., block 606, block 608, block 610). Thus, both branches are traversed for each file handle corresponding to a caching-eligible operation. If the target operation is not a caching-compliant operation, decision block 604, no further evaluation is performed for advisory cache purposes, block 618.

In an example, the bloom filter utilized by the data management components can quickly become quite large (e.g., 100,000+ buckets, each of which holds a 16-bit integer), and with two models in use at any time, the memory requirement can become large. However, in an example, these boom filters are global to the node and are not specific to any particular volume, so the memory is charged only once against the whole filer, and not repeatedly for each discrete volume. In other configurations, different filters can be used for different scopes (e.g., one per volume, different filters for different kinds of content).

In an example, the capacity of the bloom filter can be chosen based on the likely number of unique file handles that may be encountered during a relevant (e.g., 15-second, 30-second, 45-second, 60-second) window for building a new model. The 100,000-bucket example is just an simple estimate to be used as an example and may be wrong in either direction. Larger filters are more accurate but are more expensive to manage.

Some of the examples described above are described as using a fixed cadence for the timing window (e.g., accumulate data into the bloom filter for 30 seconds, at which point it becomes promoted to being active). In an example, this cutover happens when either of two things occur: either the 30-second population time concludes, or the number of nonzero buckets within the bloom filter reaches some percentile (e.g., 15%, 20%, 25%). Thus, if the bloom filter becomes populated even to some relatively low threshold, an early cutover may occur to avoid the risk of false positives. The result is that, under very heavy activity levels, the operation accumulation window becomes shorter and shorter, but the answers coming back from the table remain sufficiently accurate.

In an example, an epoch value can be used on each bucket to avoid some computational expense in exchange for more memory usage and more computation on each insertion and lookup. In the approach described, the bloom filter is frequently populated with data and then, a relatively short time (e.g., 30 seconds later), the bloom filter is wiped back to empty and populated it again. Clearing a filter would normally require filling the whole thing with zeroes, which is an expensive operation. Using an epoch value amortization of that cost. Conceptually, the filter is "wiped" by incrementing a global epoch value (the "real version") and there is an epoch value associated with each bucket in the filter as well. If a bucket's epoch value does not match the global value, then that bucket's epoch value is inferred the value of zero the bucket can be added to. However, if the epoch mismatches, then the is bucket back to zero and its epoch value is set to match the global value. This is one approach to avoiding using a zero-fill across the whole (large) memory structure frequently (e.g., every 30 seconds).

A bloom filter is, by its nature, inaccurate. The canonical implementation offers a guarantee of successful lookup after insert, but it does not offer a guarantee of the reverse. That is, the bloom filter can present a false positive, where a lookup of a not-truly-inserted item reports success. The false positive rate is a function of table size, insertion count, and hash function efficacy. And to achieve even this guarantee in a parallel-execution environment, the implementation typically requires locks or other atomic test-and-change mechanisms to prevent the various entities from accidentally overwriting information that their peers are in the process of changing concurrently.

However, these locks are not necessary if the approach being utilized is capable of functioning properly with the inaccuracy in the table's contents in exchange for greater performance. In an example, the techniques described to monitor bottleneck conditions meets this criterion. And in exchange for this inaccuracy, locking can be omitted as the bloom filter is updated or consulted.

In an example, as each caching-compliant operation runs, that operation's target file handle is submitted to the new model bloom filter, block 614. Continuing the k=4 example, above, the handle is hashed four ways, mapping to up to four different "buckets" within the filter. Other bloom filter configurations can also be utilized (e.g., k=2, k=8).

Being a counting bloom filter, each bucket value is incremented as it is encountered, block 616. In an example, a rough total for the number of insertions is also maintained, also block 616. In an example, advisory cache entries are only generated for caching-compliant operations so the bloom filter is only used for caching-compliant operations.

In an example, in addition to use of the new model bloom filter as described, the current model bloom filter is also utilized for each file handle corresponding to a caching-eligible operation. The current model bloom filter is checked using the target file/directory handle, block 606.

Use of the counting bloom filter as described provides at least two advantages. First, the approach is relatively fast and has a fixed memory cost. Only a limited amount of computation is required for each access and there is no corresponding memory allocation or locking. This makes the mechanism suitable for always-on behavior. Second, the mechanism can indicate whether a particular file handle was inserted previously and can give a good estimate of how many times it was previously inserted. Also, the mechanism can provide a good estimate of what percentage of the overall number of the insertions in the table were performed on behalf of the subject file/directory.

In an example, the access to the current model bloom filter provides a guess at the raw frequency with which this particular file was accessed during that model's building window (referred to as the file's "raw access count"), and a guess at percentile with which this individual file is itself the peak bottleneck (referred to as the file's "access percentile"), block 608.

In the k=4 example, during any lookup of a file/directory handle against the current model filter, the requested file/directory handle is again hashed four ways which yields up to four different buckets; the lowest value in any of those buckets is returned and represents the probable number of times that this specific file/directory handle was submitted to the table.

The raw access count information and access percentile information are evaluated to determine whether an advisory cache for the file/directory handle should be generated (or updated), block 610. In an example, if the file handle's count is 60 and the total number of insertions is 80, then this file could be considered to be 60/80=75% towards being the bottleneck. Other parameters (or combinations of parameters) can be utilized to determine when a bottleneck condition is starting (or has occurred) and an advisory cache entry can be generated (or modified) for the corresponding operation, block 612.

In an example, if the raw access count is below some minimum threshold, it is not cached. The raw access count represents a rough count of accesses to the corresponding file/directory during a specified time window (e.g., one minute worth of traffic). If some relatively large N-operations-per-minute are not observed on the file/directory, caching is likely not going to be helpful.

Figure 7:
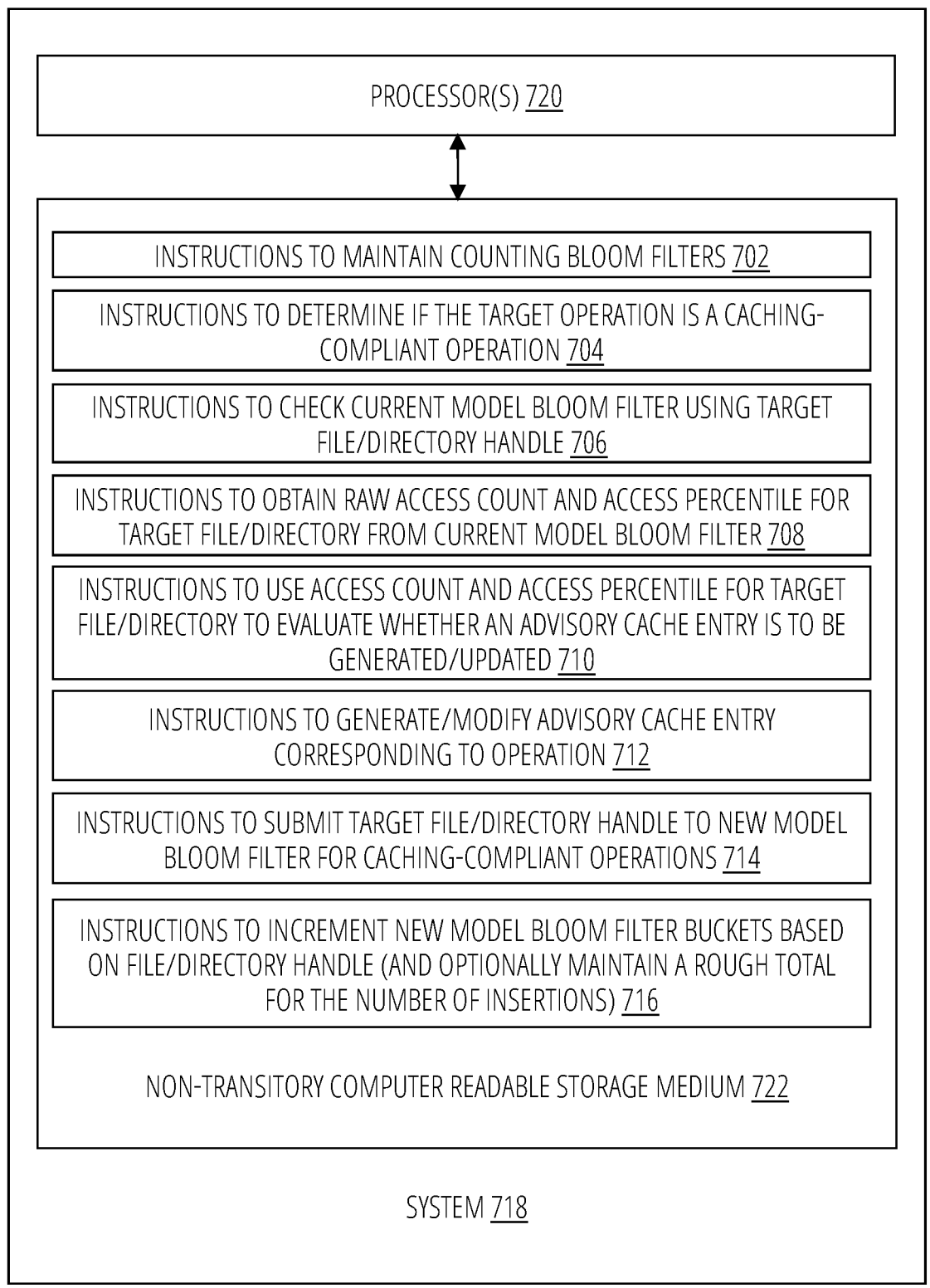
FIG. 7 illustrates an example system to provide an approach to identifying which file(s) and/or directory/directories are contributing to observed traffic bottlenecks that can be utilized for managing load sharing and caching.

FIG. 7 illustrates an example system to provide an approach to identifying which file(s) and/or directory/directories are contributing to observed traffic bottlenecks that can be utilized for managing load sharing and caching. In an example, system 718 can include processor(s) 720 and non-transitory computer readable storage medium 722. In an example, processor(s) 720 and non-transitory computer readable storage medium 722 can be part of a node having a storage operating system that can provide some or all of the functionality of the ONTAP software as mentioned above.

Non-transitory computer readable storage medium 722 may store instructions 702, 704, 706, 708, 710, 714 and 716 that, when executed by processor(s) 720, cause processor(s) 720 to perform various functions. Examples of processor(s) 720 may include a microcontroller, a microcontroller, a microprocessor, a CPU, a GPU, a DPU, an ASIC, a FPGA, a SoC, etc. Examples of non-transitory computer readable storage medium 722 include tangible media such as RAM, ROM, EEPROM, flash memory, a hard disk drive, etc.

In an example, the capacity of the bloom filter can be chosen based on the likely number of unique file handles that may be encountered during a relevant (e.g., 15-second, 30-second, 45-second, 60-second) window for building a new model. The 100,000-bucket example is just a simple estimate to be used as an example. An epoch value can be used on each bucket to avoid some computational expense in exchange for more memory usage and more computation on each insertion and lookup.

Instructions 702 cause processor(s) 720 to implement a counting bloom filter. In an example, the bloom filter is a typical bloom filter (e.g., k=4 with a collection of four distinct hash algorithms). In an example, except that each cell in the filter is an unsigned integer rather than a single bit. In other implementations, different bloom filter configuration can be utilized.

Instructions 704 cause processor(s) 720 to evaluate each read request to determine whether it includes one or more caching-compliant operations. In an example, a caching-compliant operation is one that meets the criteria described above. In alternate configurations, additional and/or different criteria can be used for evaluating a caching-compliant operation.

Instructions 706 cause processor(s) 720 to check the current model bloom filter using the target file/directory handle. In an example, in addition to use of the current model bloom filter as described, the new model bloom filter is also utilized for each file handle corresponding to a caching-eligible operation.

Instructions 708 cause processor(s) 720 to use the bloom filter to guess at the raw frequency with which this particular file was accessed during that model's building window (referred to as the file's "raw access count"), and a guess at percentile with which this individual file is itself the peak bottleneck (referred to as the file's "access percentile"), block 608.

Instructions 710 cause processor(s) 720 to use the raw access count information and access percentile information to determine whether an advisory cache for the file/directory handle should be generated (or updated). In an example, if the file handle's count is 60 and the total number of insertions is 80, then this file could be considered to be 50/90=55% towards being the bottleneck.

Instructions 712 cause processor(s) 720 generate an advisory cache entry for the corresponding operation. Other parameters (or combinations of parameters) can be utilized to determine when a bottleneck condition is starting (or has occurred).

Instructions 714 cause processor(s) 720 to submit each operation's target file handle to the new model bloom filter. Continuing the k=4 example, above, the handle is hashed four ways, mapping to up to four different "buckets" within the filter. Other bloom filter configurations can also be utilized (e.g., k=2, k=8). In the k=4 example, during any lookup of a file/directory handle against the current model filter, the requested file/directory handle is again hashed four ways which yields up to four different buckets; the lowest value in any of those buckets is returned and represents the probable number of times that this specific file/directory handle was submitted to the table.

Instructions 716 cause processor(s) 720 to increment each bucket value in the counting bloom filter. In an example, a rough total for the number of insertions is also maintained. In an example, advisory cache entries are only generated for caching-compliant operations so the bloom filter is only used for caching-compliant operations.

Figure 8:
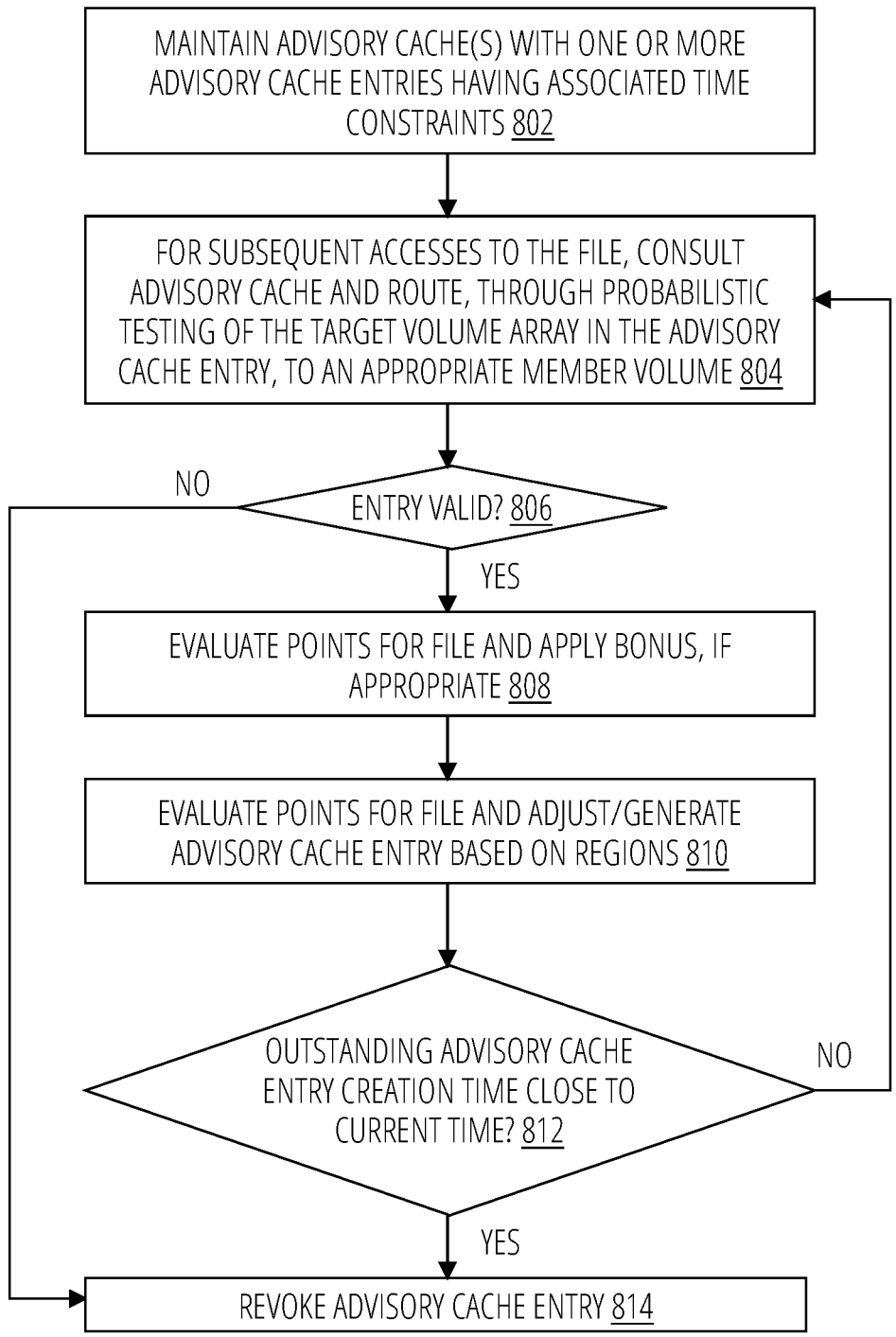
FIG. 8 is a flow diagram corresponding to an example approach to revoking advisories that have been utilized for managing load sharing and caching.

FIG. 8 is a flow diagram corresponding to an example approach to revoking advisories that have been utilized for managing load sharing and caching. As discussed above, data management components (or other system components) perform the various operations and computations to produce a cache advisory entry (if appropriate). A new advisory cache entry is pushed to the local member volume advisory cache, and, if the response is to be serviced on a different node, it is also conveyed to that other node along with the regular file operation response, block 802. In an example, the receiving node makes a copy of the advisory cache entry in its own advisory cache for future consultation. Subsequent accesses to the file can consult that advisory cache and thus be routed, through probabilistic testing of the target volume array in the advisory cache entry, to an appropriate member volume, block 804. Probabilistic testing is only one way to use the array of candidate data. Alternatively, a deterministic consultation method could be utilized as well if desired.

As discussed above, the advisory cache entries are time limited. That is, they are enforced only for a specified period of time (e.g., a few minutes) if not refreshed or otherwise replaced with new directives. If an advisory cache entry corresponding to the subsequent access is not valid, decision block 806, for example, because it has expired, the advisory cache entry is revoked, block 814.

In an example, if the load on a member volume continues to be higher than average even after issuing advisory cache entries, the node can apply a slowly growing cumulative "bonus" to the point computations to increase the rates of caching until the load begins to level out, block 808. In an example, a bonus could also be used to decrease the thresholds at which caching is employed. In an example, there can be discrete levels of volume activity at which advisories are generated, for example, at a minimum threshold the issuing volume must have an above-average activity level divided into multiple (e.g., three, six, eight) regions (e.g., a significantly higher-than-average level is required to issue new advisories, while an activity level that's below some minimum value might cause the node to actively revoke some or all of its existing advisories to try to draw traffic back to itself), block 810.

In an example, if the node discovers that it has an outstanding advisory in its own advisory cache for a file/directory that has a creation time that is close to the current time, decision block 812, a node might revoke an advisory, block 814. Revoking an advisory in this way is also can also be applied when performing an origin-side cache revocation, even if the change time is not necessarily invoked.

Figure 9:
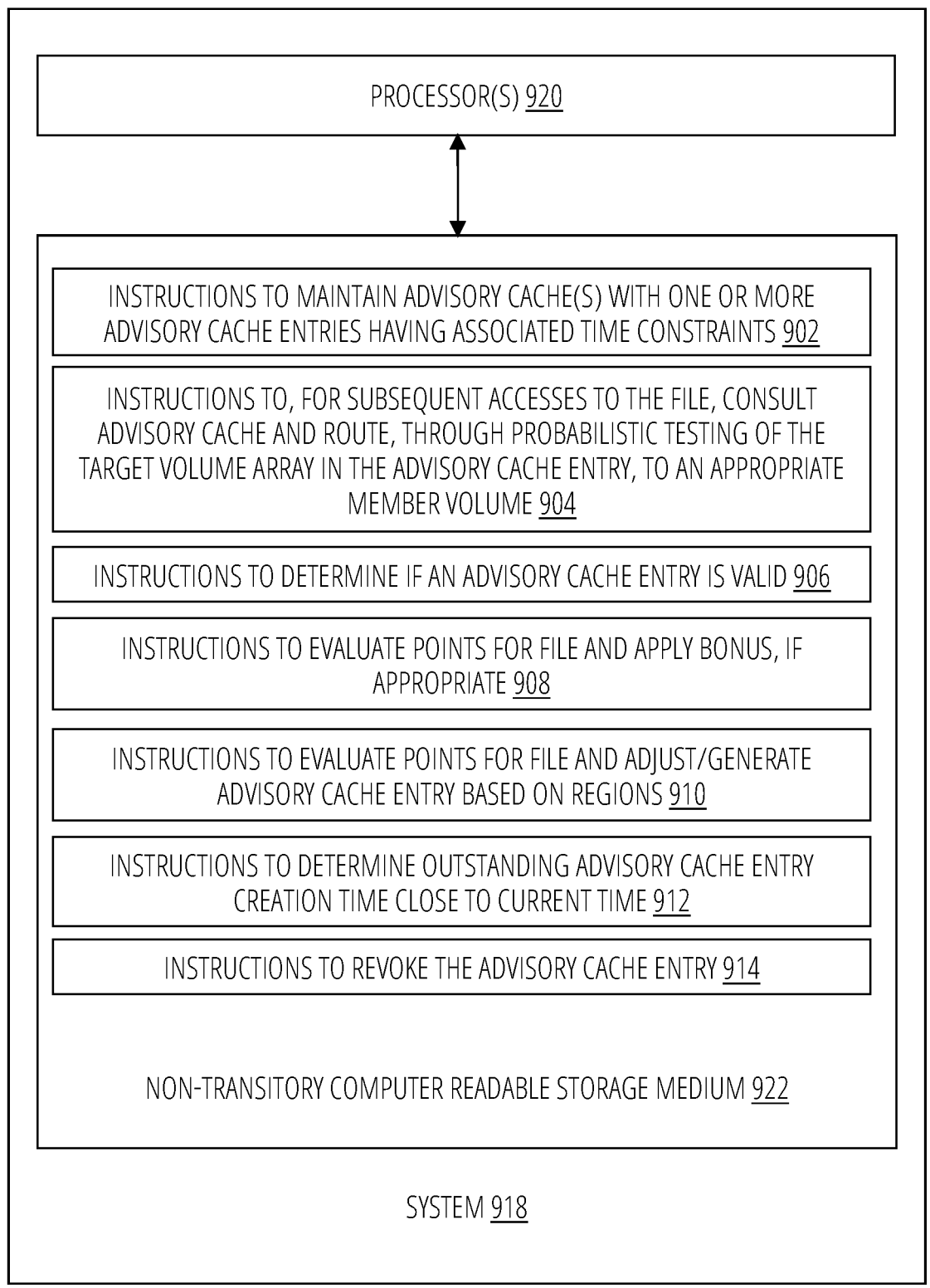
FIG. 9 illustrates an example system to provide an approach to revoking advisories that have been utilized for managing load sharing and caching.

FIG. 9 illustrates an example system to provide an approach to revoking advisories that have been utilized for managing load sharing and caching. In an example, system 918 can include processor(s) 920 and non-transitory computer readable storage medium 922. In an example, processor(s) 920 and non-transitory computer readable storage medium 922 can be part of a node having a storage operating system that can provide some or all of the functionality of the ONTAP software as mentioned above.

Non-transitory computer readable storage medium 922 may store instructions 902, 904, 906, 908, 910, 912 and 914 that, when executed by processor(s) 920, cause processor(s) 920 to perform various functions. Examples of processor(s) 920 may include a microcontroller, a microcontroller, a microprocessor, a CPU, a GPU, a DPU, an ASIC, a FPGA, a SoC, etc. Examples of non-transitory computer readable storage medium 922 include tangible media such as RAM, ROM, EEPROM, flash memory, a hard disk drive, etc.

Instructions 902 cause processor(s) 920 to maintain advisory cache(s) with one or more advisory cache entries having associated time constraints. In an example, data management components (or other system components) perform the various operations and computations to produce a cache advisory entry (if appropriate) and to maintain the advisory cache structures. When a new advisory cache entry is pushed to the local member volume advisory cache, and, if the response is to be serviced on a different node, the advisory cache entry is also conveyed to the other node along with the regular file operation response.

Instructions 904 cause processor(s) 920 to, for subsequent accesses to the file, consult advisory cache and route, through probabilistic testing of the target volume array in the advisory cache entry, to an appropriate member volume. In an example, the receiving node makes a copy of the advisory cache entry in its own advisory cache for future consultation. Subsequent accesses to the file can consult that advisory cache and thus be routed, through probabilistic testing of the target volume array in the advisory cache entry, to an appropriate member volume. Probabilistic testing is only one way to use the array of candidate data.

Instructions 906 cause processor(s) 920 to determine if an advisory cache entry is valid. A validity period (or expiration) corresponds to a time during which advisory cache entry is valid. In an example, the validity period can be defined in terms of minutes (e.g., 3 minutes, 5 minutes, 1 minute); however, alternate time scales (e.g., 30 seconds, one hour, 90 seconds, one day) can also be used. In an example, if advisory cache entry 340 is accessed after it expires it will be discarded from the advisory cache (e.g., instructions 914).

Instructions 908 cause processor(s) 920 to evaluate points for the file and apply bonus, if appropriate. In an example, if the load on a member volume continues to be higher than average even after issuing advisory cache entries, the node can apply bonus points to the point computations to increase the rates of caching until the load begins to level out or decline. In an example, bonus points could also be used to decrease the thresholds at which caching is employed.

Instructions 910 cause processor(s) 920 to evaluate points for file and adjust/generate advisory cache entry based on regions. In an example, there can be discrete levels of volume activity at which advisories are generated, for example, at a minimum threshold the issuing volume must have an above-average activity level divided into multiple (e.g., three, four, five, ten) regions (e.g., a significantly higher-than-average level is required to issue new advisories, while an activity level that's below some minimum value might cause the node to actively revoke some or all of its existing advisories to try to draw traffic back to itself).

Instructions 912 cause processor(s) 920 to determine the whether the outstanding advisory cache entry creation time close to the current time. In an example, if the node discovers that it has an outstanding advisory in its own advisory cache for a file/directory that has a creation time that is close to the current time a node might revoke an advisory, instructions 914.

FIG. 10 is a schematic block diagram of a storage operating system that may be advantageously used with the subject matter. One or more network blades (e.g., network blade (N-Blade) 1002 and one or more disk blades (e.g., disk blade (D-Blade) 1006) can be interconnected with each other and configured to provide various functional components of storage operating system 1000, which operate to provide the load sharing and caching functionality utilizing advisory caches as described above.

Storage operating system 1000 includes a series of software layers organized to form an integrated network protocol stack or, more generally, multi-protocol engine 1004 that provides data paths for clients to access information stored on a node using block and file access protocols. In an example, multi-protocol engine 1004 includes a media access layer (e.g., media access 1042, media access 1044) of network drivers (e.g., gigabit Ethernet drivers) that interfaces to network protocol layers, such as the Internet Protocol (IP) layer (e.g., IP 1038, IP 1040) and the corresponding supporting transport mechanisms, the Transport Control Protocol (TCP) layer (e.g., TCP 1030, TCP 1034) and the User Datagram Protocol (UDP) layer (e.g., UDP 1032).

An example file system (FS) protocol layer (e.g., FS 1036) provides multi-protocol file access and, to that end, includes support for Direct Access File System (DAFS) protocol (e.g., DAFS 1016), Network File System (NFS) protocol (e.g., NFS 1020), Common Internet File System (CIFS) protocol (e.g., CIFS 1022) and the Hypertext Transfer Protocol (HTTP) (e.g., HTTP 1024). Virtual Interface (VI) layer (e.g., VI 1018) implements an architecture to provide direct access transport (DAT) capabilities, such as Remote Direct Memory Access (RDMA), to support Direct Access File System (DAFS) protocol (e.g., DAFS 1016).

An Internet Small Computer Systems Interface (ISCSI) driver layer (e.g., iSCSI 1028) provides block protocol access over TCP/IP network protocol layers, while a Cluster Fabric (CF) driver layer (e.g., CF interface 1010) receives and transmits block access requests and responses to and from the node. In an example, the CF and iSCSI drivers provide CF-specific and iSCSI-specific access control to the blocks and, thus, manage exports of LUNs to either iSCSI or FCP or, alternatively, to both iSCSI and FCP when accessing the blocks on the node.

In addition, storage operating system 1000 includes a series of software layers organized to form storage server 1008 that provides data paths for accessing information stored on disks of a node. To that end, storage server 1008 includes file system module 1048 in cooperating relation with remote access module 1050, RAID system 1052 and disk driver system 1054. RAID system 1052 manages the storage and retrieval of information to and from the volumes/disks in accordance with I/O operations, while disk driver system 1054 implements a disk access protocol such as, e.g., the SCSI protocol.

File system module 1048 implements a virtualization system of storage operating system 1000 through the interaction with one or more virtualization modules illustratively embodied as, e.g., a virtual disk (vdisk) module (not shown) and SCSI target module 1026. SCSI target module 1026 is generally disposed between the FC and iSCSI 1028, file system 1036 and file system 1048 to provide a translation layer of the virtualization system between the block (LUN) space and the file system space, where LUNs are represented as blocks.

File system module 1048 is illustratively a message-based system that provides logical volume management capabilities for use in access to the information stored on the storage devices, such as disks. That is, in addition to providing file system semantics, file system module 1048 provides functions normally associated with a volume manager. These functions include (i) aggregation of the disks, (ii) aggregation of storage bandwidth of the disks, and (iii) reliability guarantees, such as mirroring and/or parity (RAID).

File system module 1048 illustratively implements an exemplary a file system having an on-disk format representation that is block-based using, e.g., 4 kilobyte (kB) blocks and using index nodes ("inodes") to identify files and file attributes (such as creation time, access permissions, size and block location). File system module 1048 uses files to store meta-data describing the layout of its file system; these meta-data files include, among others, an inode file. A file handle, i.e., an identifier that includes an inode number, is used to retrieve an inode from disk. As described in greater detail below, a rebalancing scanner can operation in storage operating system 1000 that supports inodes to scan and evaluate files in order to find one or more candidate files to move to a remote container.

Broadly stated, all inodes of the write-anywhere file system are organized into the inode file. A file system (FS) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from a client is forwarded as a packet over a computer network and onto a node where it is received via a network adapter. A network driver processes the packet and, if appropriate, passes it on to a network protocol and file access layer for additional processing prior to forwarding to the write-anywhere file system. Here, the file system generates operations to load (retrieve) the requested data from disk if it is not resident "in core", i.e., in memory. If the information is not in memory, the file system indexes into the inode file using the inode number to access an appropriate entry and retrieve a logical vbn. The file system then passes a message structure including the logical vbn to, for example, RAID system 1052; the logical vbn is mapped to a disk identifier and disk block number (disk,dbn) and sent to an appropriate driver (e.g., SCSI) of the disk driver system. The disk driver accesses the dbn from the specified disk and loads the requested data block(s) in memory for processing by the node. Upon completion of the request, the node (and operating system) returns a reply to the client over the network.

Remote access module 1050 is operatively interfaced between file system module 1048 and RAID system 1052. Remote access module 1050 is illustratively configured as part of the file system to implement the functionality to determine whether a newly created data container, such as a subdirectory, should be stored locally or remotely. Alternatively, remote access module 1050 may be separate from the file system. As such, the description of remote access module 1050 being part of the file system should be taken as exemplary only. Further, remote access module 1050 determines which remote flexible volume should store a new subdirectory if a determination is made that the subdirectory is to be stored remotely. More generally, remote access module 1050 implements the heuristics algorithms used for the adaptive data placement. However, it should be noted that the use of a remote access module should be taken as illustrative. In alternative aspects, the functionality may be integrated into the file system or other module of the storage operating system. As such, the description of remote access module 1050 performing certain functions should be taken as exemplary only.

It should be noted that while the subject matter is described in terms of locating new subdirectories, the principles of the disclosure may be applied at other levels of granularity, e.g., files, blocks, etc. As such, the description contained herein relating to subdirectories should be taken as exemplary only.

It should be noted that the software "path" through the storage operating system layers described above needed to perform data storage access for the client request received at the node may alternatively be implemented in hardware. That is, a storage access request data path may be implemented as logic circuitry embodied within a field programmable gate array (FPGA) or an application specific integrated circuit (ASIC). This type of hardware implementation increases the performance of the storage service provided by the node in response to a request issued by client 180. Alternatively, the processing elements of adapters (e.g., network adapter 216, storage adapter 224, cluster access adapter 220) may be configured to offload some or all of the packet processing and storage access operations, respectively, from the processor (e.g., processor 204, processor 206), to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node, implement data access semantics of a general-purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that aspects of the disclosure described herein may apply to any type of special-purpose (e.g., file server, filer or storage serving appliance) or general-purpose computer, including a standalone computer or portion thereof, embodied as or including a storage system. Moreover, the teachings contained herein can be adapted to a variety of storage system architectures including, but not limited to, a network-attached storage environment, a storage area network and disk assembly directly attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the subject matter may be utilized with any suitable file system, including a write in place file system.

Illustratively, storage server 1008 is embodied as disk blade (D-Blade) 1006 of storage operating system 1000 to service one or more volumes of a disk array (e.g., disk array 146). In addition, multi-protocol engine 1004 is embodied as network blade (N-Blade) 1002 to: (i) perform protocol termination with respect to a client issuing incoming data access request packets over a network, as well as (ii) redirect those data access requests to any storage server of the cluster. Moreover, network blade (N-Blade) 1002 and disk blade (D-Blade) 1006 cooperate to provide a highly scalable, distributed storage system architecture for a cluster (e.g., cluster 100). To that end, each module includes a cluster fabric (CF) interface module (e.g., CF interface 1010, CF interface 1046) adapted to implement intra-cluster communication among the modules (e.g., utilizing CF protocol 1012), including disk element to disk element communication for data container striping operations, for example.

The protocol layers, e.g., the NFS/CIFS layers and the iSCSI/IFC layers, of network blade (N-Blade) 1002 function as protocol servers that translate file-based and block-based data access requests from clients into CF protocol messages used for communication with disk blade (D-Blade) 1006. That is, the network element servers convert the incoming data access requests into file system primitive operations (commands) that are embedded within CF messages by CF interface 1010 for transmission to disk blade (D-Blade) 1006. Notably, CF interface 1010 and CF interface 1046 cooperate to provide a single file system image across all disk blades in a cluster. Thus, any network port of a network element that receives a client request can access any data container within the single file system image located on any disk element of the cluster.

Further, in an illustrative aspect of the disclosure, network blade (N-Blade) 1002 and disk blade (D-Blade) 1006 are implemented as separately scheduled processes of storage operating system 1000; however, in an alternate aspect, the network blade (N-Blade) 1002 and disk blade (D-Blade) 1006 may be implemented as pieces of code within a single operating system process. Communication between a network element and disk element is thus illustratively affected through the use of message passing between the modules although, in the case of remote communication between a network element and disk element of different nodes, such message passing occurs over cluster switching fabric 116. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API).

Examples of such an agnostic protocol are the SpinFS and SpinNP protocols available from NetApp™, Inc.

CF interface 1010 and CF interface 1046 implement a CF protocol for communicating file system commands among the modules of the cluster. Communication is illustratively affected by the disk element exposing the CF API to which a network element (or another disk element) issues calls. To that end, the CF interface modules are organized as a CF encoder and CF decoder. The CF encoder encapsulates a CF message as (i) a local procedure call (LPC) when communicates a file system command to a disk element residing on the same node or (ii) a remote procedure call (RPC) when communicating the command to a disk element residing on a remote node of the cluster. In either case, the CF decoder de-encapsulates the CF message and processes the file system command.

Illustratively, the remote access module may utilize CF messages to communicate with remote nodes to collect information relating to remote flexible volumes. A CF message is used for RPC communication over the switching fabric between remote modules of the cluster; however, it should be understood that the term "CF message" may be used generally to refer to LPC and RPC communication between modules of the cluster. The CF message includes a media access layer, an IP layer, a UDP layer, a reliable connection (RC) layer and a CF protocol layer. The CF protocol is a generic file system protocol that conveys file system commands related to operations contained within client requests to access data containers stored on the cluster; the CF protocol layer is that portion of a message that carries the file system commands. Illustratively, the CF protocol is datagram based and, as such, involves transmission of messages or "envelopes" in a reliable manner from a source (e.g., network blade (N-Blade) 1002) to a destination (e.g., disk blade (D-Blade) 1006). The RC layer implements a reliable transport protocol that is adapted to process such envelopes in accordance with a connectionless protocol, such as UDP.

In one embodiment, a data container is represented in the write-anywhere file system as an inode data structure adapted for storage on the disks 130. In such an embodiment, an inode includes a meta-data section and a data section. The information stored in the meta-data section of each inode describes the data container (e.g., a file) and, as such, includes the type (e.g., regular, directory, vdisk) of file, its size, time stamps (e.g., access and/or modification time) and ownership (e.g., user identifier (UID) and group ID (GID), of the file, and a generation number. The contents of the data section of each inode may be interpreted differently depending upon the type of file (inode) defined within the type field. For example, the data section of a directory inode includes meta-data controlled by the file system, whereas the data section of a regular inode includes file system data. In this latter case, the data section includes a representation of the data associated with the file.

Specifically, the data section of a regular on-disk inode may include file system data or pointers, the latter referencing 4 KB data blocks on disk used to store the file system data. Each pointer is preferably a logical vbn to facilitate efficiency among the file system and the RAID system when accessing the data on disks. Given the restricted size (e.g., 128 bytes) of the inode, file system data having a size that is less than or equal to 64 bytes is represented, in its entirety, within the data section of that inode. However, if the length of the contents of the data container exceeds 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section of the inode (e.g., a second level inode) references an indirect block (e.g., a first level L1 block) that contains 1024 pointers, each of which references a 4 KB data block on disk. For file system data having a size greater than 64 MB, each pointer in the data section of the inode (e.g., a third level L3 inode) references a double-indirect block (e.g., a second level L2 block) that contains 1024 pointers, each referencing an indirect (e.g., a first level L1) block. The indirect block, in turn, which contains 1024 pointers, each of which references a 4 KB data block on disk. When accessing a file, each block of the file may be loaded from disk into the memory.

When an on-disk inode (or block) is loaded from disk into memory, its corresponding in-core structure embeds the on-disk structure. For example, the dotted line surrounding the inode indicates the in-core representation of the on-disk inode structure. The in-core structure is a block of memory that stores the on-disk structure plus additional information needed to manage data in the memory (but not on disk). The additional information may include, e.g., a "dirty" bit. After data in the inode (or block) is updated/modified as instructed by, e.g., a write operation, the modified data is marked "dirty" using the dirty bit so that the inode (block) can be subsequently "flushed" (stored) to disk.

According to one embodiment, a file in a file system comprises a buffer tree ("buftree") that provides an internal representation of blocks for a file loaded into memory and maintained by the write-anywhere file system. A root (top-level) inode, such as an embedded inode, references indirect (e.g., level 1) blocks. In other embodiments, there may be additional levels of indirect blocks (e.g., level 2, level 3) depending upon the size of the file. The indirect blocks (e.g., and inode) includes pointers that ultimately reference data blocks used to store the actual data of the file. That is, the data of file are contained in data blocks and the locations of these blocks are stored in the indirect blocks of the file. Each level 1 indirect block may include pointers to as many as 1024 data blocks. According to the "write anywhere" nature of the file system, these blocks may be located anywhere on the disks.

Figure 11:
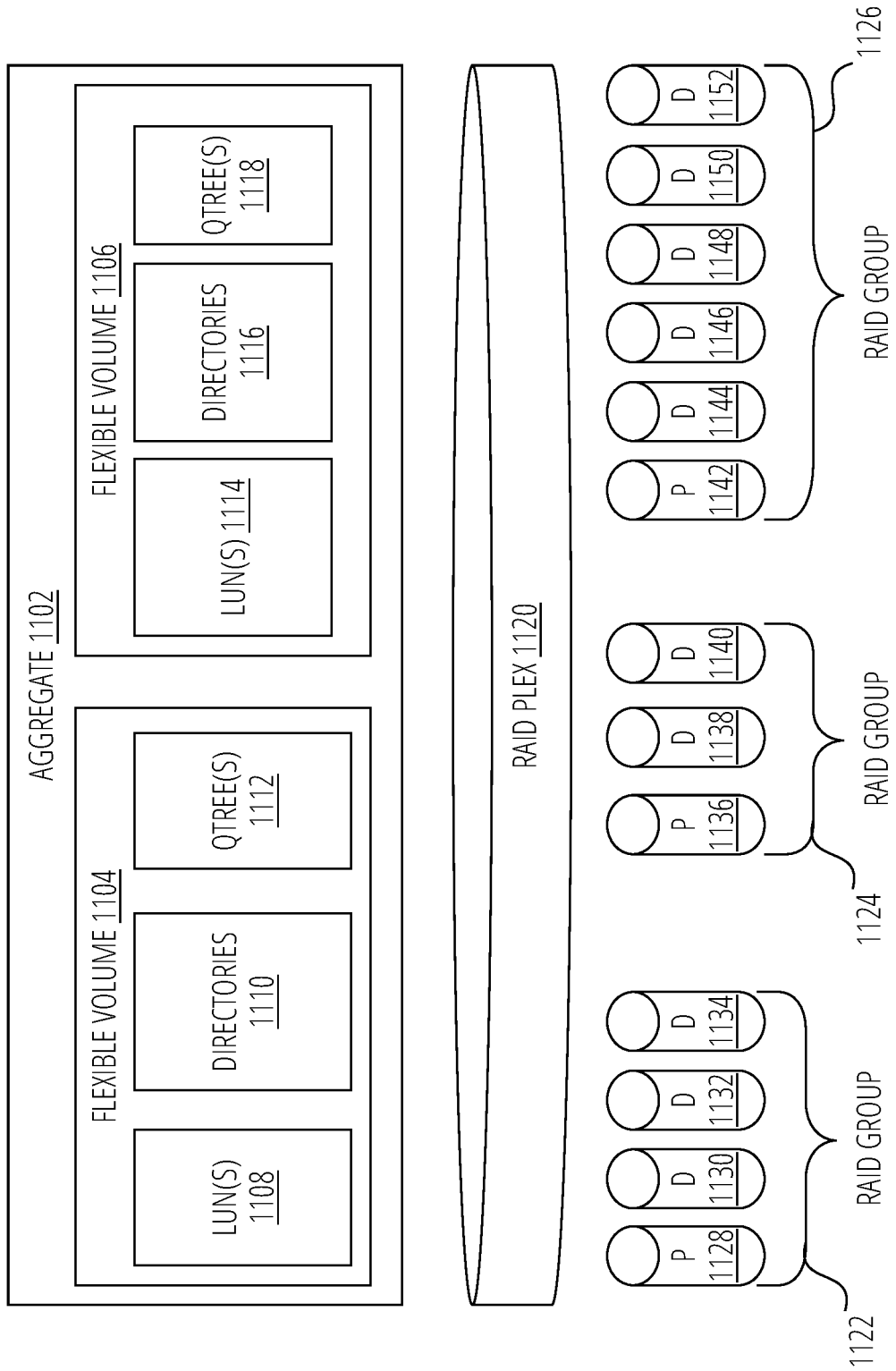
FIG. 11 illustrates one embodiment of a block diagram of an aggregate that can provide multiple flexible volumes (member volumes) that can be managed to provide load sharing and caching as described herein.

FIG. 11 illustrates one embodiment of a block diagram of an aggregate that can provide multiple flexible volumes (member volumes) that can be managed to provide load sharing and caching as described herein. In one embodiment, a file system layout is provided that apportions an underlying physical volume into one or more virtual volumes (or flexible volume) of a storage system.

In such an embodiment, the underlying physical volume is an aggregate comprising one or more groups of disks, such as RAID groups, of the node. In an example, aggregate 1102 has its own physical volume block number (pvbn) space and maintains meta-data, such as block allocation structures, within that pvbn space. Each flexible volume (e.g., flexible volume 1104, flexible volume 1106) has its own virtual volume block number (vvbn) space and maintains meta-data, such as block allocation structures, within that vvbn space. Each flexible volume is a file system that is associated with a container file; the container file is a file in aggregate 1102 that contains all blocks used by the flexible volume. Moreover, each flexible volume comprises data blocks and indirect blocks that contain block pointers that point at either other indirect blocks or data blocks.

LUN(s) 1108, directories 1110, Qtrec(s) 1112 and Qtree(s) 1118 may be included within flexible volume 1104 and/or flexible volume 1106, such as dual vbn flexible volumes, that, in turn, are contained within aggregate 1102. In one embodiment, flexible volume 1104 and/or flexible volume 1106 including elements within the flexible volumes may comprise junctions to provide redirection information to other flexible volumes, which may be contained within aggregate 1102, may be stored in aggregate service by other key modules in the distributed file system. Assets, the description of elements being stored within a flexible volume should be taken as exemplary only. Aggregate 1102 is illustratively layered on top of the RAID system, which is represented by at least one RAID plex 1120 (depending upon whether the storage configuration is mirrored), wherein each RAID plex 1120 includes at least one RAID group (e.g., RAID group 1122, RAID group 1124, RAID group 1126). Each RAID group further comprises a plurality of disks, one or more data (D) disks (e.g., 1130, 1132, 1134, 1138, 1140, 1144, 1146, 1148, 1150, 1152) and at least one (P) parity disk (e.g., 1128, 1136, 1142).

Whereas aggregate 1102 is analogous to a physical volume of a conventional storage system, a flexible volume (e.g., flexible volume 1104, flexible volume 1106) is analogous to a file within that physical volume. That is, aggregate 1102 may include one or more files, wherein each file contains a flexible volume and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume is also a logical volume, it has its own block allocation structures (e.g., active, space and summary maps) in its vvbn space.

In a further embodiment, pvbns are used as block pointers within buffer trees of files stored in a flexible volume. This "hybrid" flexible volume example involves the insertion of only the pvbn in the parent indirect block (e.g., inode or indirect block). On a read path of a logical volume, a "logical" volume (vol) info block has one or more pointers that reference one or more fsinfo blocks, each of which, in turn, points to an inode file and its corresponding inode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk,dbn occurs at the file system/RAID system boundary of the storage operating system.

In a dual vbn hybrid flexible volume example, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, inode file level 0 (L0) blocks.

A root (top-level) inode, such as an embedded inode, references indirect (e.g., level 1) blocks. Note that there may be additional levels of indirect blocks (e.g., level 2, level 3) depending upon the size of the file. The indirect blocks (and inode) include pvbn/vvbn pointer pair structures that ultimately reference data blocks used to store the actual data of the file. The pvbns reference locations on disks of the aggregate, whereas the vvbns reference locations within files of the flexible volume. The use of pvbns as block pointers in the indirect blocks provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perform pvbn-to-vvbn translations; yet, on the read path, the pvbn is available.

A container file is a file in the aggregate that includes all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. In an example, the aggregate includes an illustrative hidden meta-data root directory that contains subdirectories of flexible volumes.

Specifically, a physical file system directory includes a subdirectory for each flexible volume in the aggregate, with the name of subdirectory being a file system identifier (fsid) of the flexible volume. Each fsid subdirectory (flexible volume) contains at least two files, a file system file and a storage label file. The storage label file is illustratively a 4 kB file that contains meta-data similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created or being destroyed, etc.

Aggregate 1102 can be configured as a FlexGroup as supported by the ONTAP® operating system. However, it is expressly contemplated that any appropriate storage operating system may be enhanced for use in accordance with the inventive principles described herein. In the FlexGroup example, a constituent volume refers to the underlying flexible volume (e.g., flexible volume 1104, flexible volume 1106) that provide the storage functionality of the FlexGroup. A FlexGroup is a single namespace that can be made up of multiple constituent volumes ("constituents"). In an example, each FlexGroup contains an entity (e.g., "FlexGroup State") that has an object corresponding to each constituent of the FlexGroup and collects information for each constituent. The FlexGroup State can also exchange constituent information with other peer FlexGroups.

Figure 12:
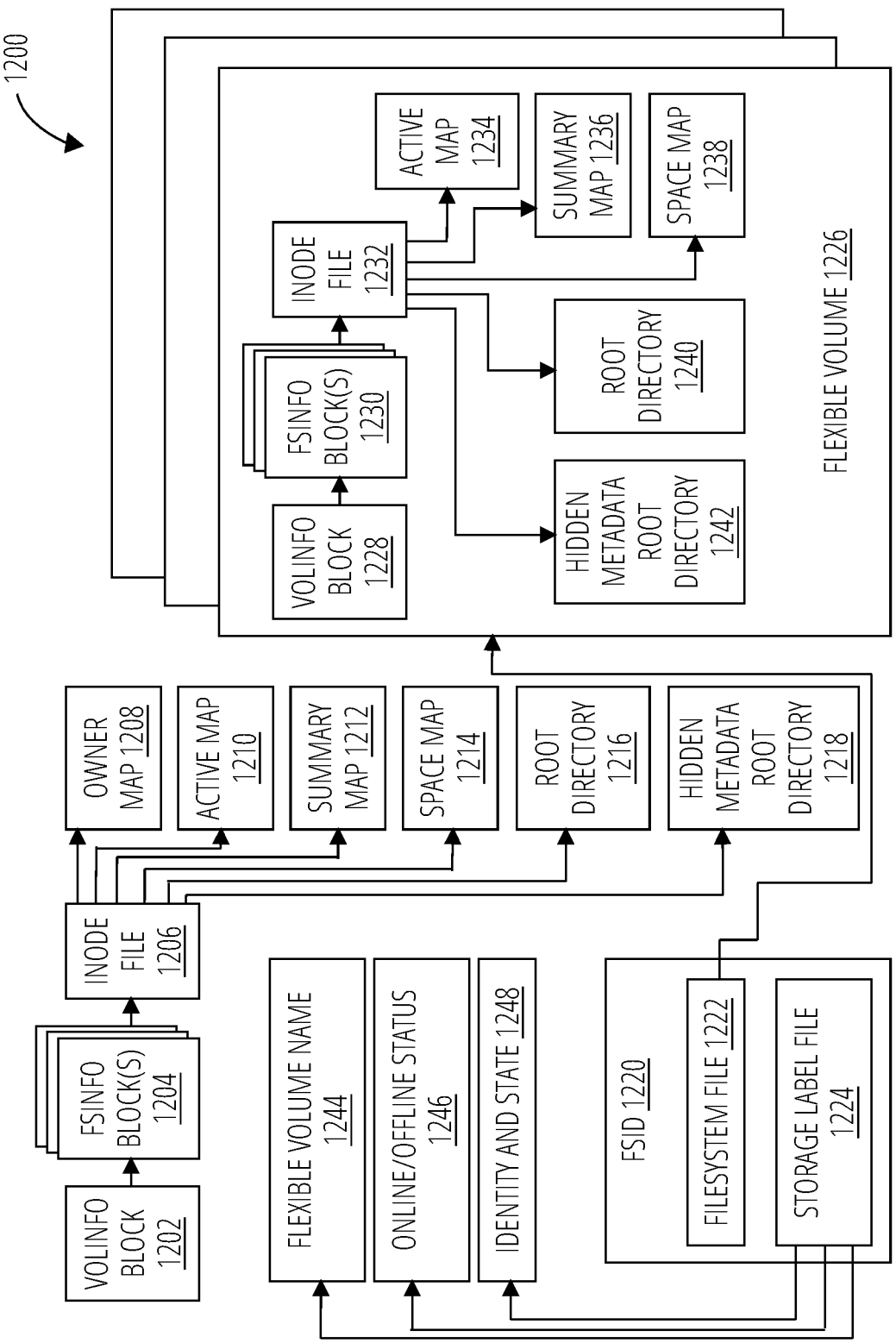
FIG. 12 illustrates one embodiment of a block diagram of an on-disk layout of the aggregate.

FIG. 12 illustrates one embodiment of a block diagram of an on-disk layout of an aggregate. Some of the elements illustrated in FIG. 12 can be utilized by a rebalancing scanner to evaluate files for potential movement to a remote container including, for example, filesystem file 1222, hidden metadata root directory 1242, etc.

The storage operating system (e.g., storage operating system 210) utilizes the RAID system (e.g., RAID system 1052), to assemble a physical volume of pvbns to create an aggregate (e.g., aggregate 1102), with pvbns 1 and 2 comprising a "physical" volinfo block 1202 for the aggregate. In an example, volinfo block 1202 contains block pointers to fsinfo block(s) 1204, each of which may represent a snapshot of the aggregate. Each fsinfo block(s) 1204 includes a block pointer to an inode file 1206 that contains inodes of a plurality of files, including owner map 1208, active map 1210, summary map 1212 and space map 1214, as well as other special meta-data files. Inode file 1206 further includes root directory 1216 and hidden metadata root directory 1218, the latter of which includes a namespace having files related to a flexible volume in which users cannot "see" the files. In an example, hidden metadata root directory 1218 includes the fsid/directory structure (Fsid 1220) that contains filesystem file 1222 and storage label file 1224. In an example, root directory 1216 in the aggregate is empty; files related to the aggregate are organized within hidden metadata root directory 1218.

In addition to being embodied as a container file having level 1 blocks organized as a container map, filesystem file 1222 includes block pointers that reference various file systems embodied as one or more flexible volume 1226. The aggregate maintains these flexible volumes at special reserved inode numbers. In an example, each flexible volume 1226 also has reserved inode numbers within its flexible volume space that are used for, among other things, the block allocation bitmap structures. As noted, the block allocation bitmap structures, e.g., active map 1234, summary map 1236 and space map 1238, are located in each flexible volume.

Specifically, each flexible volume 1226 has the same inode file structure/content as the aggregate, with the exception that there is no owner map and no fsid/file system file, storage label file directory structure in hidden metadata root directory 1242. To that end, each flexible volume 1226 has volinfo block 1228 that points to one or more fsinfo block(s) 1230, each of which may represent a snapshot, along with the active file system of the flexible volume. Each fsinfo block, in turn, points to an inode file 1232 that, as noted, has the same inode structure/content as the aggregate with the exceptions noted above. Each flexible volume 1226 has its own inode file 1232 and distinct inode space with corresponding inode numbers, as well as its own root directory 1240 and subdirectories of files that can be exported separately from other flexible volumes.

Storage label file 1224 contained within hidden metadata root directory 1218 of the aggregate is a small file that functions as an analog to a conventional RAID label. A RAID label includes physical information about the storage system, such as the volume name; that information is loaded into storage label file 1224. Illustratively, storage label file 1224 includes the flexible volume name 1244 of the associated flexible volume 1226, online/offline status 1246 of the flexible volume, and identity and state 1248 of the associated flexible volume (whether it is in the process of being created or destroyed).

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Reference in the specification to "one example" or "an example" means that a particular feature, structure, or characteristic described in connection with the example is included in at least one embodiment of the disclosure. The appearances of the phrase "in one example" in various places in the specification are not necessarily all referring to the same embodiment.

It is contemplated that any number and type of components may be added to and/or removed to facilitate various embodiments including adding, removing, and/or enhancing certain features. For brevity, clarity, and case of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

The terms "component", "module", "system," and the like as used herein are intended to refer to a computer-related entity, either software-executing general-purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device type, in accordance with the claimed subject matter.

What is claimed is:

1. A non-transitory computer-readable storage medium having stored thereon instructions that, when executed by one or more processors, cause the one or more processors to:
   receive a data request at a first data storage node having a first set of data management components, a first advisory cache, and a first set of data storage devices, the data request having a corresponding file;
   check the first advisory cache for an entry corresponding to the file, wherein the advisory cache entry includes at least a key value that identifies the corresponding file and an expiration value to indicate a validity period for the advisory cache entry;
   route the data request based on a file characteristic corresponding to the data request if there is no corresponding entry in the first advisory cache, and routing the data request to a second data storage node based on the corresponding entry in the first advisory cache when available;
   determine whether conditions on the first node indicate a bottleneck condition;
   generate an advisory cache entry in the first advisory cache corresponding to the bottleneck condition in response to determining that a bottleneck condition exists; and
   transmit information corresponding to the advisory cache entry to the second node.

2. The non-transitory computer-readable storage medium of claim 1 wherein the file characteristic comprises a file handle.

3. The non-transitory computer-readable storage medium of claim 1 wherein the file characteristic comprises a directory handle.

4. The non-transitory computer-readable storage medium of claim 1 wherein determining whether conditions on the first node indicate a bottleneck condition comprises applying a points-based analysis based on queue latency.

5. The non-transitory computer-readable storage medium of claim 4 wherein the points-based analysis is a function of at least raw access count and access percentile.

6. The non-transitory computer-readable storage medium of claim 5 wherein the raw access count and the access percentile are maintained in a bloom filter.

7. The non-transitory computer-readable storage medium of claim 4 further comprising utilizing a bonus points approach to adjusting the cache advisory entry.

8. The non-transitory computer-readable storage medium of claim 1 wherein the advisory cache entry comprises at least a key value identifies the corresponding file or directory, an expiration value to indicate a validity period for the advisory cache entry, and a candidates list indicating one or more nodes that can be used to service subsequent read requests.

9. A system comprising:
   a first data storage node having a first set of a first set of data management components, a first advisory cache, and a first set of data storage devices;
   a second data storage node coupled with the first data storage node, the second data storage node having a second set of data management components, a second advisory cache, and a second set of data storage devices;

the first node to receive a data request having a corresponding file, the first node to check the first advisory cache for an entry corresponding to the file, wherein the advisory cache entry includes at least a key value that identifies the corresponding file and an expiration value to indicate a validity period for the advisory cache entry and, wherein the first node routes the read request based on a file characteristic corresponding to the data request if there is no corresponding entry in the first advisory cache, and routing the data request to the second data storage node based on the corresponding entry in the first advisory cache when available;

the second set of data management components to receive the data request from the first node and to service the request with the second set of data storage devices, the second node to analyze the data request from the first node to determine whether conditions on the second node indicate a bottleneck condition, and in response to determining a bottleneck condition exists, generating an advisory cache entry in the second advisory cache corresponding to the bottleneck condition;

the second node to return to the first node data read when servicing the data request, and, if the bottleneck condition exists, information corresponding to the advisory cache entry; and the first node to return at least the data as a response to the read request received by the first node.

10. The system of claim 9 wherein the file characteristic comprises a file handle.

11. The system of claim 9 wherein the file characteristic comprises a directory handle.

12. The system of claim 9 wherein determining whether conditions on the second node indicate a bottleneck condition comprises applying a points-based analysis based on queue latency.

13. The system of claim 12 wherein the points-based analysis is a function of at least raw access count and access percentile.

14. The system of claim 13 wherein the raw access count and the access percentile are maintained in a bloom filter.

15. The system of claim 12 further comprising utilizing a bonus points approach to adjusting the cache advisory entry.

16. The system of claim 9 wherein the advisory cache entry comprises at least a key value identifies the corresponding file or directory, an expiration value to indicate a validity period for the advisory cache entry, and a candidates list indicating one or more nodes that can be used to service subsequent read requests.

17. A method comprising:
receiving a data request at a first data storage node having a first set of data management components, a first advisory cache, and a first set of data storage devices, the read request having a corresponding file;

checking the first advisory cache for an entry corresponding to the file, wherein the advisory cache entry includes at least a key value that identifies the corresponding file and an expiration value to indicate a validity period for the advisory cache entry;

routing the data request based on a file characteristic corresponding to the data request if there is no corresponding entry in the first advisory cache, and routing the data request to a second data storage node based on the corresponding entry in the first advisory cache when available;

determining whether conditions on the first node indicate a bottleneck condition;

generating an advisory cache entry in the first advisory cache corresponding to the bottleneck condition in response to determining that a bottleneck condition exists; and transmitting information corresponding to the advisory cache entry to the second node.

18. The method of claim 17 wherein the file characteristic comprises a file handle.

19. The method of claim 17 wherein the file characteristic comprises a directory handle.

20. The method of claim 17 wherein determining whether conditions on the first node indicate a bottleneck condition comprises applying a points-based analysis based on queue latency.

21. The method of claim 20 wherein the points-based analysis is a function of at least raw access count and access percentile.

22. The method of claim 21 wherein the raw access count and the access percentile are maintained in a bloom filter.

23. The method of claim 20 further comprising utilizing a bonus points approach to adjusting the cache advisory entry.

24. The method of claim 17 wherein the advisory cache entry comprises at least a key value identifies the corresponding file or directory, an expiration value to indicate a validity period for the advisory cache entry, and a candidates list indicating one or more nodes that can be used to service subsequent read requests.

* * * * *